United States Patent
Yoshida et al.

(10) Patent No.: US 10,525,757 B2
(45) Date of Patent: Jan. 7, 2020

(54) THERMAL TRANSFER SHEET, COATING LIQUID FOR COLORANT LAYER, METHOD FOR MANUFACTURING THERMAL TRANSFER SHEET, AND IMAGE FORMING METHOD

(71) Applicant: DAI NIPPON PRINTING CO., LTD., Tokyo (JP)

(72) Inventors: Kazuya Yoshida, Tokyo (JP); Hiroaki Segawa, Tokyo (JP); Tomohiko Imoda, Tokyo (JP); Yoshimasa Kobayashi, Tokyo (JP); Tomoko Suzuki, Tokyo (JP); Hiroyuki Hasegawa, Tokyo (JP); Kano Sakamoto, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/680,411

(22) Filed: Aug. 18, 2017

(65) Prior Publication Data

US 2017/0348992 A1   Dec. 7, 2017

Related U.S. Application Data

(62) Division of application No. 14/781,221, filed as application No. PCT/JP2014/059321 on Mar. 28, 2014, now Pat. No. 9,764,580.

(30) Foreign Application Priority Data

Mar. 29, 2013 (JP) .................................. 2013-071897
Sep. 5, 2013 (JP) .................................. 2013-184375

(Continued)

(51) Int. Cl.
*B41M 5/385* (2006.01)
*B41M 5/395* (2006.01)

(Continued)

(52) U.S. Cl.
CPC ............ *B41M 5/395* (2013.01); *B41M 5/385* (2013.01); *B41M 5/3858* (2013.01);
(Continued)

(58) Field of Classification Search
CPC .. B41M 5/382; B41M 5/38228; B41M 5/385; B41M 5/3858; B41M 5/39; B41M 5/395;
(Continued)

(56) References Cited

U.S. PATENT DOCUMENTS 4,822,674 A   4/1989   Malhotra et al.
5,747,217 A   5/1998   Zaklika et al.
(Continued)

FOREIGN PATENT DOCUMENTS

EP   0333335 A2   9/1989
EP   0894050 A1   2/1999
(Continued)

OTHER PUBLICATIONS

Machine translation of detailed description of JP 2002-211147 acquired May 16, 2019.*

(Continued)

*Primary Examiner* — Gerard Higgins
(74) *Attorney, Agent, or Firm* — Burr & Brown, PLLC

(57) ABSTRACT

The purpose of the present invention is to provide a thermal transfer sheet which can prevent a kick and a scumming, and can form a photographic tone color image of high quality with a continuous tone image by sublimation transfer, while expanding the range of choices for colorants to be included in a colorant layer; a coating liquid for colorant layer to be used for forming the colorant layer of this thermal transfer sheet; a method for manufacturing this thermal transfer sheet; and image forming method employing this thermal transfer sheet. The problem is solved by a thermal transfer sheet (1) in which at least a colorant layer (3) is layered on (Continued)

a substrate sheet (2), wherein the colorant layer (3) contains a predetermined solvent, a colorant (10x) dispersible in the predetermined solvent, a dispersant, and a binder resin, and the dispersant being one or more selected from the group consisting of polyether-based dispersants, graft type polymer dispersants, acryl-based block type polymer dispersants, urethane-based polymer dispersants and azo-based dispersants.

3 Claims, 2 Drawing Sheets

(30) Foreign Application Priority Data

Sep. 30, 2013 (JP) ................................ 2013-205833
Mar. 28, 2014 (JP) ................................ 2014-068207

(51) Int. Cl.

| | | |
|---|---|---|
| C08K 5/3437 | (2006.01) | |
| C09D 129/14 | (2006.01) | |
| C08L 71/02 | (2006.01) | |
| B41M 5/382 | (2006.01) | |
| B41M 5/392 | (2006.01) | |
| C09B 25/00 | (2006.01) | |
| C09B 67/08 | (2006.01) | |
| C09B 67/46 | (2006.01) | |
| C09D 151/00 | (2006.01) | |
| C09D 153/00 | (2006.01) | |
| C08L 67/04 | (2006.01) | |
| C08L 71/00 | (2006.01) | |
| B41M 5/39 | (2006.01) | |
| B41M 5/42 | (2006.01) | |

(52) U.S. Cl.
CPC ........ *B41M 5/38228* (2013.01); *B41M 5/392* (2013.01); *C08K 5/3437* (2013.01); *C08L 67/04* (2013.01); *C08L 71/00* (2013.01); *C08L 71/02* (2013.01); *C09B 25/00* (2013.01); *C09B 67/009* (2013.01); *C09B 67/0013* (2013.01); *C09D 129/14* (2013.01); *C09D 151/00* (2013.01); *C09D 153/00* (2013.01); *B41M 5/3856* (2013.01); *B41M 5/39* (2013.01); *B41M 5/42* (2013.01); *B41M 2205/02* (2013.01); *B41M 2205/30* (2013.01); *B41M 2205/36* (2013.01); *B41M 2205/38* (2013.01)

(58) Field of Classification Search
CPC .......... B41M 2205/02; B41M 2205/30; B41M 2205/42
USPC ........ 503/227; 428/32.6, 32.69, 32.75, 32.77
See application file for complete search history.

(56) References Cited

U.S. PATENT DOCUMENTS

| | | |
|---|---|---|
| 6,818,363 B2 | 11/2004 | Fincher et al. |
| 2003/0044584 A1 | 3/2003 | Wachi et al. |
| 2005/0239647 A1 | 10/2005 | Caspar et al. |
| 2007/0006758 A1 | 1/2007 | Caspar et al. |
| 2009/0008576 A1 | 1/2009 | Shim et al. |
| 2010/0239794 A1 | 9/2010 | Andrews et al. |

FOREIGN PATENT DOCUMENTS

| | | | |
|---|---|---|---|
| EP | 0920385 | A1 | 6/1999 |
| EP | 1017570 | A1 | 7/2000 |
| EP | 1155369 | A2 | 11/2001 |
| EP | 1284856 | A2 | 2/2003 |
| JP | 61-041596 | A | 2/1986 |
| JP | 62-152789 | A | 7/1987 |
| JP | 01-281991 | A | 11/1989 |
| JP | 05-155158 | A | 6/1993 |
| JP | 05-212977 | A | 8/1993 |
| JP | 06-316173 | A | 11/1994 |
| JP | 1995-132678 | A | 5/1995 |
| JP | 1998-006643 | A | 1/1998 |
| JP | 2000-141913 | A | 5/2000 |
| JP | 2001-039039 | A | 2/2001 |
| JP | 2002-211147 | A | 7/2002 |
| JP | 2002-347360 | A | 12/2002 |
| JP | 2006-056139 | A | 3/2006 |
| JP | 2007-098925 | A | 4/2007 |
| JP | 2007-119762 | A | 5/2007 |
| JP | 2007-290347 | A | 11/2007 |
| JP | 2009-286060 | A | 12/2009 |
| JP | 2010-083003 | A | 4/2010 |
| JP | 2010-531758 | A | 9/2010 |
| JP | 2011-056902 | A | 3/2011 |
| JP | 2012-246469 | A | 12/2012 |

OTHER PUBLICATIONS

The Partial Supplementary European Search Report dated Jan. 26, 2017; Appln. No. 14775741.3-1704 /2979891 PCT/JP2014059321.
The Extended European Search Report dated Jun. 19, 2017; Appln. No. 14775741.3-1704/2979891 PCT/JP2014059321.
The International Search Report dated Jun. 24, 2014; PCT/JP2014/059321.
USPTO RR dated Oct. 13, 2016 in connection with U.S. Appl. No. 14/781,221.
USPTO NFOA dated Dec. 29, 2016 in connection with U.S. Appl. No. 14/781,221.
USPTO NOA dated May 25, 2017 in connection with U.S. Appl. No. 14/781,221.

* cited by examiner

THERMAL TRANSFER SHEET, COATING LIQUID FOR COLORANT LAYER, METHOD FOR MANUFACTURING THERMAL TRANSFER SHEET, AND IMAGE FORMING METHOD

TECHNICAL FIELD

The present invention relates to a thermal transfer sheet, a coating liquid for colorant layer, a method for manufacturing thermal transfer sheet and an image forming method.

BACKGROUND TECHNIQUE

Conventionally, thermal transfer method has been widely used as a simple printing method. The melt-transfer method as one of the thermal transfer method is an image forming method wherein a thermal transfer sheet, which has a thermally fusible ink layer comprising a colorant, such as a pigment, and a binder such as a thermally fusible wax or resin, is superposed on a thermal transfer image-receiving sheet such as a paper or a plastic film; then, an energy in accordance with image information is applied from the back side of the thermal transfer sheet by a heating means such as a thermal head; and thereby the colorant is transferred onto the thermal transfer image-receiving sheet together with the binder. The image formed by the melt-transfer method is suitable for recording binary images such as characters, since the image has excellent sharpness and high concentration.

On the other hand, the sublimation transfer method as another one of the thermal transfer method is another image forming method wherein a thermal transfer sheet, which has a colorant layer comprising a dye which is able to be transferred thermally by sublimation, is superposed on a thermal transfer image-receiving sheet in which a dye receiving layer is provided on a substrate, then, an energy in accordance with image information is applied from the back side of the thermal transfer sheet by a heating means such as a thermal head; and thereby only the sublimable dye is transferred onto the thermal transfer image-receiving sheet. With respect to the sublimation transfer method, since the transferring amount of dye can be controlled by the amount of energy applied, it is possible to form a gray-scale image in which image density is controlled. In addition, since the colorants used are dyes, the image formed has transparency. Thus, when dyes of different colors are superposed, the reproducibility of neutral tints becomes excellent. Therefore, when using thermal transfer sheets of different colors such as yellow, magenta, cyan, black or the like, and transferring dye of each color on the thermal transfer image-receiving sheet so as to superpose the dyes each other, it is possible to form a photographic full-color image of high quality in which reproducibility of neutral tints is excellent. Furthermore, since the sublimation transfer method can express the full color image as the original onto the thermal transfer image-receiving sheet clearly, it is applied to a color image forming for a digital camera, a video camera, a computer or the like. The image is one that is high-quality comparable to silver halide photography.

In general, the thermal transfer sheet is stored and used in wound state. When the colorant contained in the colorant layer is present in a state of being localized to the surface of the colorant layer by bleeding, etc., the sublimable dye tends to migrate to the back face layer side of the thermal transfer sheet (so-called "kick"). When the sublimable dye migrated to the back layer side is again re-migrated to the colorant layer side (so-called "back"), in particular, in the case that, in the thermal transfer sheet in which a plural numbers of colorant layers which are different in the hue from each other are provided so as to be layered in parallel on the substrate sheet across the surface of the substrate sheet, as being frame sequentially, the sublimable dye migrated to the back layer side is again re-migrated to another colorant layer which is different in the hue from the sublimable dye, a decrease in color development property would be caused at the time of image formation using the another colorant layer.

Under these circumstances, with respect to the thermal transfer sheet capable of suppressing the occurrence of kick, various studies have been made. For example, in Patent literature 2, a thermal transfer sheet which comprises a dye layer provided on one surface of the substrate sheet, and a back face layer provided on another surface of the substrate sheet, wherein the dye layer contains an indoaniline based dye, a polyvinyl acetal resin A, and a polyvinyl acetal resin B (represented by the formula (1) in Patent literature 2), has been proposed. Further, in Patent literature 3, a thermal transfer sheet which comprises a dye layer provided on one surface of the substrate sheet film and containing a resin and a dye, and a back face layer provided on another surface of the substrate sheet and containing a lubricant and a resin, wherein the dye layer contains a prescribed dye (the dye represented by the formula (1) in Patent literature 3) in a prescribed amount range, has been proposed. According to the thermal transfer sheets proposed by Patent literatures 2 and 3, it is stated that it is possible to prevent the migration of colorant to the back layer side during the storage of the thermal transfer sheet.

Further, in the thermal transfer sheet proposed in Patent Literature 2, since the kind of the dye contained in the dye layer, and the kind of the binder resin are limited to the prescribed components, a problem such that the width of the material selection becomes narrower is inherent.

PRIOR ART LITERATURE

Patent Literature

Patent literature 1: JP 2007-119762 A
Patent literature 2: JP 2009-286060 A
Patent literature 3: JP 2010-83003 A

SUMMARY OF THE INVENTION

Problems to be Solved by the Invention

The present invention has been made in view of such circumstances, and the present invention aims principally to provide a thermal transfer sheet which can prevent a kick and a scumming, and can form a photographic tone color image of high quality with a continuous tone image by sublimation transfer, while expanding the range of choices for colorants to be included in a colorant layer; a coating liquid for colorant layer to be used for forming the colorant layer of this thermal transfer sheet; a method for manufacturing this thermal transfer sheet; and image forming method employing this thermal transfer sheet.

Means for Solving the Problems

An aspect of the present invention for solving the above-mentioned problems is thermal transfer sheet which comprises a substrate and a colorant layer provided on one surface of the substrate sheet, wherein the colorant layer contains a predetermined solvent, a colorant dispersible in the predetermined solvent, a dispersant and a binder resin, and wherein the dispersant is one or more kinds of dispersants selected from the group consisting of polyether-based dispersants, graft type polymer dispersants, acryl-based block type polymer dispersants, urethane-based polymer dispersants and azo-based dispersants.

Further, the colorant layer may contain a quinophthalone-based colorant represented by the following formula 1 as a colorant dispersible in the predetermined solvent:

[Chem. 1]

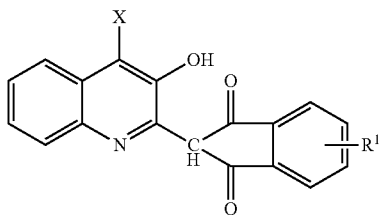

Formula 1

Wherein, X represents a hydrogen atom or a halogen atom, $R^1$ represents a hydrogen atom, an alkyl group or derivative thereof having 1 to 5 carbon atoms, an acyl group including an alkyl group or a benzoic ring and having a total carbon number of 6 to 10.

In addition, the colorant layer may further contain a colorant represented by the following formula 2 as a colorant dispersible to the predetermined solvent:

[Chem. 2]

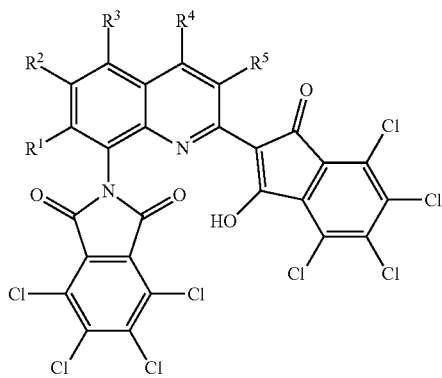

Formula 2 wherein, each of $R^1$-$R^5$ represents independently a hydrogen atom, or a sulfonated derivative having at least one sulfonic acid group (—$SO_3H$) or sulfonamide group.

Another aspect of the present invention for solving the above-mentioned problems is a coating liquid for colorant layer to be used for forming a colorant layer of a thermal transfer sheet, wherein the coating liquid for colorant layer contains a predetermined solvent, a colorant dispersible in the predetermined solvent, a dispersant and a binder resin; wherein the colorant dispersible in the predetermined solvent is dispersed in a particle size of not less than 50 nm and not more than 300 nm in the coating liquid for colorant layer; and, wherein the dispersant is one or more kinds of dispersants selected from the group consisting of polyether-based dispersants, graft type polymer dispersants, acryl-based block type polymer dispersants, urethane-based polymer dispersants and azo-based dispersants.

In addition, the coating liquid for the colorant layer in the above invention may further contain a quinophthalone-based colorant represented by the above formula 1 as a colorant dispersible to the predetermined solvent.

Still another aspect of the present invention for solving the above-mentioned problems is a method of manufacturing a thermal transfer sheet, which comprises a colorant layer forming step where a coating liquid for colorant layer is applied onto a surface of a substrate sheet to form a colorant layer; wherein the coating liquid for colorant layer used in the colorant layer forming step contains a predetermined solvent, a colorant dispersible in the predetermined solvent, a dispersant and a binder resin; wherein the dispersant is one or more kinds of dispersants selected from the group consisting of polyether-based dispersants, graft type polymer dispersants, acryl-based block type polymer dispersants, urethane-based polymer dispersants and azo-based dispersants.

In addition, the coating liquid for colorant layer may further contain a quinophthalone-based colorant represented by the above formula 1 as a colorant dispersible to the predetermined solvent.

Further, another aspect of the present invention for solving the above-mentioned problems is an image forming method for forming image on a thermal transfer image-receiving sheet by using a thermal transfer sheet having a colorant layer on a surface of a substrate sheet in combination with the thermal transfer image-receiving sheet having a receiving layer on a surface of another substrate sheet, wherein the colorant layer of the thermal transfer sheet contains a predetermined solvent, a colorant dispersible in the predetermined solvent, a dispersant and a binder resin; and wherein the dispersant is one or more kinds of dispersants selected from the group consisting of polyether-based dispersants, graft type polymer dispersants, acryl-based block type polymer dispersants, urethane-based polymer dispersants and azo-based dispersants.

Also, the colorant layer may further contain a quinophthalone-based colorant represented by the above formula 1 as a colorant dispersible to the predetermined solvent.

Furthermore, another aspect of the present invention for solving the above-mentioned problems is a thermal transfer sheet which comprises a substrate and a colorant layer provided on one surface of the substrate sheet, wherein the colorant layer contains a predetermined solvent, a sublimable dye soluble in the predetermined solvent, a colorant dispersible in the predetermined solvent, and a binder resin.

Further, still another aspect of the present invention for solving the above-mentioned problems is a thermal transfer sheet which comprises a substrate and a colorant layer provided on one surface of the substrate sheet, wherein the colorant layer comprises a layered structure in which a first colorant layer and a second colorant layer are layered in this order; wherein the first colorant layer contains a first solvent, a sublimable dye soluble in the first solvent, and a first binder resin; and wherein the second colorant layer contains a second solvent, a colorant dispersible in the second solvent, and a second binder resin.

Further another aspect of the present invention for solving the above-mentioned problems is a method of manufacturing a thermal transfer sheet, which comprises a colorant layer forming step where a coating liquid for colorant layer is applied onto a surface of a substrate sheet to form a colorant layer; wherein the coating liquid for colorant layer contains a predetermined solvent, a sublimable dye soluble in the predetermined solvent, a colorant dispersible in the predetermined solvent, and a binder resin.

Further, the coating liquid for colorant layer may further contain a dispersant.

Furthermore, another aspect of the present invention for solving the above-mentioned problems is a method of manufacturing a thermal transfer sheet, which comprises a first colorant layer forming step where a coating liquid which contains a first solvent, a sublimable dye soluble in the first solvent and a first binder resin is applied onto a surface of a substrate sheet to form a first colorant layer; and a second colorant layer forming step where a coating liquid which contains a second solvent, a colorant dispersible in the second solvent and a second binder resin is applied onto the first colorant layer to form a second colorant layer.

Effect of the Invention

According to the thermal transfer sheet of the present invention, while expanding the range of choices for the colorant to be included in the colorant layer, in other words, without receiving any particular restrictions on the dye to be contained in the colorant layer, it is possible to prevent the kick and the scumming. Further, according to the coating liquid for colorant layer of the present invention, it is possible to attain a high colorant dispersibility, to improve coatability and thus, to form the colorant layer of a thermal transfer sheet having the above characteristics. Also, according to the manufacturing method of the thermal transfer sheet of the present invention, it is possible to manufacture a thermal transfer sheet which exhibits the above effects. According to the image forming method of the present invention, it is possible to form a high-quality photographic color image with gradation image by the sublimation transfer.

According to an embodiment of the thermal transfer sheet of the present invention, in addition to the above effects, it is possible to enhance the durability such as light resistance of the printed article, and possible to repress lowering of the printing density at the highlight portion, and thus, it is possible to form a high-quality photographic color image with gradation image by a sublimation transfer. Also, according to the thermal transfer sheet of the other embodiments, in addition to the above effects, it is possible to form a high density image.

MODES FOR CARRYING OUT THE INVENTION

<<Thermal Transfer Sheet of First Embodiment>>

Figure 1:
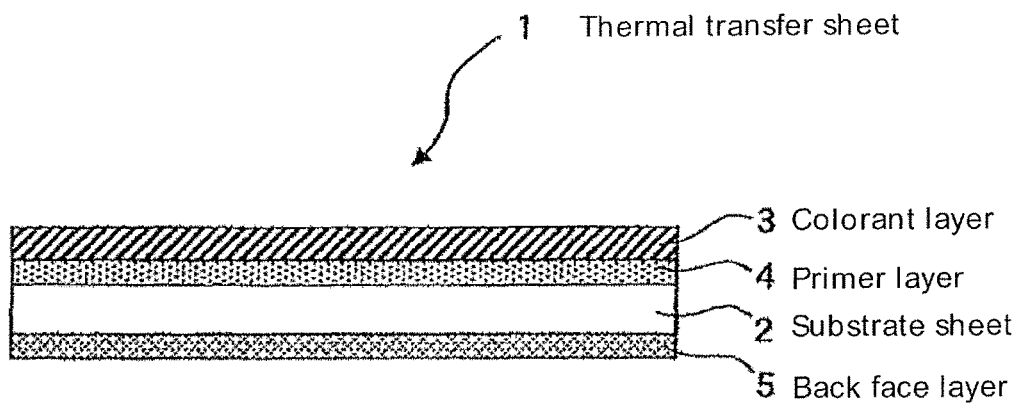
FIG. 1 is a schematic sectional view showing an example of the thermal transfer sheet of the first embodiment.

As shown in FIG. 1, the thermal transfer sheet 1 of the first embodiment according to the present invention may takes a configuration in which a primer layer 4 and a colorant layer 3 are provided in this order on one surface of a substrate 2, and a back face layer 5 is provided on another surface of the substrate. Incidentally, the primer layer 4, and the back layer 5 are optional components of the thermal transfer sheet of the first embodiment. Here, FIG. 1 is a schematic sectional view showing an example of a thermal transfer sheet of the first embodiment.

Hereinafter, each layer constituting the thermal transfer sheet 1 of the first embodiment will be described in detail.
(Substrate Sheet)

The substrate sheet 2 which constitutes the thermal transfer sheet of the first embodiment is provided for the purpose of supporting the colorant layer 3 as mentioned below, or the primer layer 2 and/or the back face layer which may be optionally provided, and it is possible to use any known material for the substrate. Concretely, as the substrate 1, any known material may be used as long as it has a known certain degree of heat resistance and a known certain degree of strength, and, it is possible to select one arbitrarily from materials known in the art. As such a substrate, for instance, a resin film, such as polyethylene terephthalate film, 1,4-polycyclohexylene dimethylene terephthalate film, polyethylene naphthalate film, polyphenylene sulfide film, polystyrene film, polypropylene film, polysulfone film, aramide film, polycarbonate film, polyvinyl alcohol film, cellulose derivatives such as cellophane and cellulose acetate, polyethylene film, polyvinyl chloride film, nylon film, polyimide film, ionomer film, etc.; and a paper such as condenser paper, paraffin paper, synthetic paper, etc.; and a complex such as complex of paper or nonwoven fabric and resin, etc., can be enumerated. Further, although these materials may be used singly, it is also possible to use a certain material as a layered film in which the material is combined with one or more of other materials.

Although there is no particular limitation on the thickness of the substrate sheet 2, the thickness of the substrate is not particularly limited, it is usually about 0.5 µm-50 µm, and preferably, about 3 µm-10 µm. The substrate may undergo adhesive treatment on its one or both surface, if necessary. By applying the adhesive treatment, it is possible to improve wettability and/or adhesiveness of a coating liquid for colorant layer against the substrate sheet on the formation of the colorant layer by coating the coating liquid for colorant layer to the substrate sheet. As the adhesive treatment, it is possible to apply any resin surface reforming technique known in the art, as-is, such as corona discharge treatment, flame treatment, ozone treatment, ultraviolet ray treatment, radiation treatment, roughening treatment, chemical agent's treatment, plasma treatment, low-temperature plasma treatment, primer treatment, grafting treatment, etc., in order to give an ease-adhesive property. These treatments may be applied singly or in combination of two or more kinds of them. In addition, in the case that a plastic film is manufactured via a stretching procedure, the primer treatment mentioned above may be also carried out by coating a primer liquid to an unstretched film and stretching the film thereafter.
(Primer Layer)

As an adhesive treatment of the substrate sheet, a primer layer 4 may be provided on the substrate sheet. When the primer layer is provided, it becomes possible to improve the adhesion between the substrate sheet 2 and the colorant layer 3, and thereby, to prevent the colorant layer 3 from being abnormally transferred during the image formation procedure. Furthermore, by using a material having low dye dyeability as a primer layer, it is possible to improve the printing density as compared with that in case of the absence of a primer layer. The primer layer 4 is an optional component of the thermal transfer sheet of the first embodiment, and, for example, it may be formed with any of the following organic materials and inorganic materials. As the organic materials, for instance, polyester based resins, polyacrylic acid ester based resins, polyvinyl acetate based resins, polyurethane based resins, styrene acrylate based resins, polyacrylamide based resins, polyamide based resins, polyether based resins, polystyrene based resins, polyethylene based resins, polypropylene based resins, vinyl based resins such as polyvinyl chloride resins, polyvinyl alcohol resins, polyvinyl pyrrolidone and modified forms thereof, and polyvinyl acetal based resins such as polyvinyl acetoacetal and polyvinyl butyral, and the like, may be exemplified. As the inorganic materials, for instance, colloidal inorganic pigment minute particles such as silica (colloidal silica), alumina or alumina hydrate (alumina sol, colloidal alumina, cationic aluminum oxide or hydrates thereof, pseudo-boehmite, etc.), aluminum silicate, magnesium silicate, magnesium carbonate, magnesium oxide, titanium oxide, and the like maybe exemplified. In addition, polymers having an inorganic main chain formed from: organic titanates, such as tetrakis (2-ethylhexyl) titanate, bis (ethyl-3-oxo-butanoate rate-$0^1$, $0^3$) bis (2-propanolate) titanium, or isopropyl tri-isostearoyl titanate; or titanium alkoxides, such as titanium tetra-isopropoxide or titanium tetra-n-butoxide, may be used as the material for the primer layer.

Further, by constituting the primer layer from the colloidal inorganic pigment minute particles, it is possible to prevent abnormal transfer of the colorant layer to the thermal transfer image-receiving sheet during the image formation more effectively. Further, during the image formation, it is possible to prevent the colorant transition from the colorant layer to the primer layer. This makes it possible to carry out the diffusion of the colorant into the receiving layer side of the thermal transfer image-receiving sheet effectively, and thus it is possible to form a high printing density image. As the colloidal inorganic pigment minute particles, colloidal silica, alumina sol are particularly preferably used. With respect to the size of these colloidal inorganic pigment minute particles, it is preferable to use them with an average primary particle diameter of not more than 100 nm, more desirably, not more than 50 nm.

By treating the surface of the substrate sheet 2, to which the colorant layer 3 will be formed, with adhesive treatment, or by providing a primer layer between the substrate sheet 2 and the colorant layer 3, it becomes possible to improve the adhesion of the substrate sheet 2 and the colorant layer 3, and to prevent the colorant layer 3 from being abnormally transferred during the image formation. Furthermore, by using a material having low dye dyeability as the primer layer, it is possible to improve the printing density as compared with that in case of the absence of a primer layer.

The primer layer can be formed by preparing a coating liquid for the primer layer where one or more materials selected from the materials enumerated as above are dispersed or dissolved in an appropriate solvent such as an organic solvent, coating thus prepared coating liquid in accordance with a known coating procedure such as the gravure printing method, the screen printing method, the reverse roll coating printing method using a gravure plate, or the like, and then drying the coated solution. Although there is no particular limitation about the coating amount of the coating liquid for the primer layer, but usually it may be about 0.02 g/m$^2$-about 10 g/m$^2$ in terms of solid content.

(Colorant Layer)

As shown in FIG. 1, on one surface of the substrate sheet 2, the colorant layer 3 is provided either directly, or indirectly via an optional primer layer and the like. The colorant layer 3 is an essential component in the thermal transfer sheet of the first embodiment, and the colorant layer 3 contains, a predetermined solvent, the colorant dispersible in the predetermined solvent, a dispersant, and a binder resin. Further, with respect to the thermal transfer sheet of the first embodiment, it is characterized in that the dispersant which is included in the colorant layer 3 is one or more kinds of dispersants selected from the group consisting of polyether-based dispersants, graft type polymer dispersants, acryl-based block type polymer dispersants, urethane-based polymer dispersants and azo-based dispersants.

According to the colorant layer 3 that satisfies the above characteristics, in the thermal transfer sheet 1 of the first embodiment, it is possible to prevent a kick and a scumming, while expanding the range of choices for colorants to be included in the colorant layer 3. Further, the printed article to be formed can enjoy high durability, such as light resistance, and can prevent the printing density at the highlight portion from lowering, and further, can provide a high quality photographic color image with gradation image by the sublimation transfer.

Hereinafter, advantages of the thermal transfer sheet 1 of the first embodiment will be explained with exemplifying a thermal transfer sheet 1X (See, FIG. 3) wherein a colorant layer 3C which includes a binder resin, a solvent, and a sublimable dye 10y dissolvable in the solvent, is formed on the substrate. Here, FIG. 3 is a partial schematic cross-sectional view of a thermal transfer sheet schematically showing the state of sublimable dye 10y in the colorant layer 3C.

Figure 3:
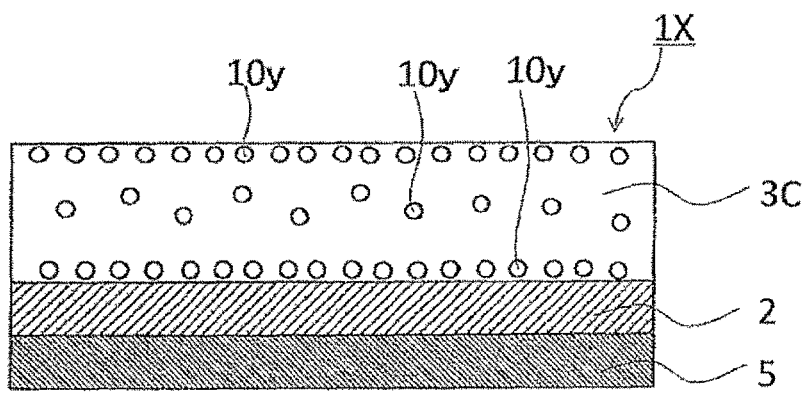
FIG. 3 is a schematic sectional view showing an example of the intermediate transfer medium for comparison

Since the sublimable dye 10y dissolvable in the solvent may usually have a low molecular weight and it is to be monomolecular, as shown in FIG. 3, the sublimable dye 10y is present in a state of being localized to the interfaces of the colorant layer 3C, wherein the colorant layer 3C was formed by using a coating liquid where the sublimable dye had been dissolved in a solvent. Thermal transfer sheet is generally stored at a rolled-up state, and in this rolled-up state, since the colorant layer 3C and the back face layer are being directly in contact with each other. Thus, under the state that the sublimable dye 10y is present so as to be localized to the interfaces of the colorant layer 3C as shown in FIG. 3, when the thermal transfer sheet is stored at the rolled-up state or the like, there is a tendency that the sublimable dye 10y are easily transferred to the back layer side of the substrate sheet 2. That is, in the case that a colorant layer 3C is simply provided on the substrate sheet 2 by using the coating liquid wherein the sublimable dye 10 has been dissolved in a solvent, it is impossible to suppress occurrences of the kick.

Meanwhile, when using a sublimable dye having a high molecular weight, and thereby, even possible to reduce the localization of the sublimable dye to the interfaces, it is difficult to prevent the occurrences of kick and/or scumming unless the affinity of between the high molecular weight sublimable dye and the binder becomes sufficiently. In other words, with respect to the sublimable dye, to have a high molecular weight is preferable in view point of preventing the localization of the sublimable dye to the interfaces, whereas to have a high affinity with the binder resin is preferable in view point of preventing the occurrence of the kick and/or the scumming, but the sublimable dyes which can satisfy both of the above mentioned conditions are considerably restricted in their kinds, and thus, the range of choices for raw materials is forced to narrow.

Figure 2:
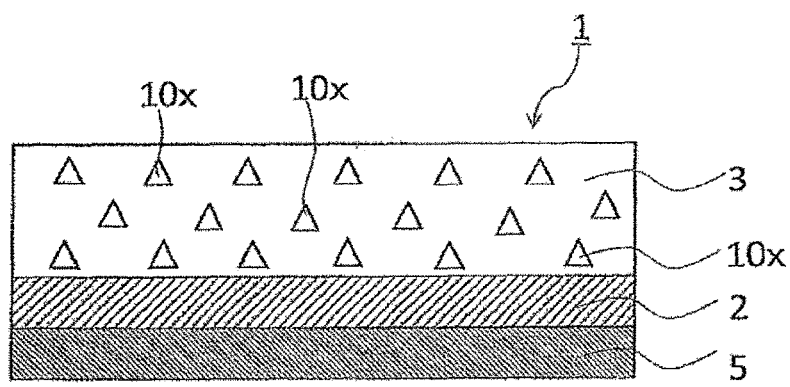
FIG. 2 is a schematic sectional view showing an example of a thermal transfer sheet of the first embodiment.

Therefore, the thermal transfer sheet 1 of the first embodiment is characterized in that, as shown in FIG. 2, the colorant layer 3 provided on one surface of the substrate sheet 2 contains a binder resin, a predetermined solvent, a colorant 10x, and a "specific dispersant" described later, and the colorant 10x is the one that is dispersible in the predetermined solvent. In other words, it is characterized in that, a colorant layer 3 is provided on one surface of the substrate sheet 2, the colorant layer being formed by using a coating liquid for the colorant layer containing the "specific dispersant", the binder resin, the colorant 10x, and the predetermined solvent to which the colorant 10x is dispersible, and dispersing the colorant.

According to the colorant layer 3 containing the predetermined solvent and the colorant 10x dispersible to the predetermined solvent, as shown in FIG. 2, it is possible to allow the colorant 10x to exist in a state of being dispersed in the colorant layer 3. Thus, it becomes possible to prevent the occurrences of the kick and/or the scumming that may occur due to the localization of the sublimable dye to the interfaces. Further, since the colorant layer 3 contains the "specific dispersant" described later, in addition to the colorant 10x dispersible to the predetermined solvent, it is possible to allow the colorant 10x dispersible to the predetermined solvent to exist in a state of being dispersed homogenously in the colorant layer, and thus, it becomes possible to prevent more effectively the occurrences of the kick and/or the scumming, in cooperation with the effects of the above mentioned colorant 10x dispersible to the predetermined solvent. Here, FIG. 2 is a schematic partial sectional view of the thermal transfer sheet schematically showing the state of the colorant 10x dispersible in a predetermined solvent which is contained in the colorant layer 3. Further, it should be noted that in FIG. 2, and FIG. 3 to 5, the sublimable dye 10y and the colorant 10x in the colorant layer are illustrated exaggeratingly.

"Binder Resin"

The colorant layer 3 contains a binder resin. The binder resin are the one that carries the colorant dispersible in the predetermined solvent. As the binder resins, for example, cellulose based resin such as methyl cellulose, ethyl cellulose, hydroxyethyl cellulose, ethyl hydroxyethyl cellulose, hydroxypropyl cellulose, cellulose acetate, cellulose butyrate, nitrocellulose, etc.; vinyl based resin such as polyvinyl alcohol, polyvinyl acetate, polyvinyl butyral, polyvinyl acetal, polyvinyl pyrrolidone, polyacrylamide, etc.; acryl based resins such as poly (meth)acrylates, poly (meth)acryl amide, etc.; polyurethane based resins; polyester based resins; phenoxy resins; and the like may be enumerated. Among them, cellulose based, vinyl based, acryl based, polyurethane based, and polyester based resins, etc., are preferred from the viewpoint of the heat resistance, the thermal transferability of the colorant and the like. The binder resin may be used singly or in any mixture of two or more of them.

As the binder resin, further, releasing graft copolymers may also be mentioned. The releasing graft copolymer may be also added as a releasing agent, in addition to the above mentioned binder resin. Herein, the above mentioned releasing graft copolymer donates the one wherein at least one releasing segment selected from the group consisting of polysiloxane segments, carbon fluoride segments, fluorinated hydrocarbon segments and long-chained alkyl segments is graft-polymerized to a polymer main chain which constitutes any of the above mentioned binder resins. As the releasing graft polymer, in particular, the graft polymer which is obtained by graft-polymerizing a polysiloxane segment to a main chain consisting of polyvinyl acetal is preferable. Furthermore, as a releasing agent for the purpose of improving releasing property, a silicone oil, a phosphoric acid ester, a fatty acid ester or the like may be added.

"Predetermined Solvent"

The colorant layer 3 contains a solvent which is capable of dispersing the colorant 10x. The predetermined solvent contained in the colorant layer 3 means a solvent capable of dispersing the colorant 10x. In other words, it means a solvent incapable of dissolving the colorant 10x. There is no particular limitation for the predetermined solvent, and can be appropriately selected depending on the relationship with the colorant 10x contained in the colorant layer 3. As examples of the solvent, for instance, organic solvent such as methyl ethyl ketone, toluene, xylene, methyl isobutyl ketone, ethyl acetate, isopropyl alcohol, ethanol, etc., and water may be enumerated. As the predetermined solvent, it is possible to use a kind of solvent singly, or to use in any mixture of two or more of them.

Here, it should be noted that, although the thermal transfer sheet of the first embodiment has an essential condition that the colorant layer 3 contains a predetermined solvent, the condition does not intend to denote that the predetermined solvent capable of dispersing the colorant 10x is positively and actively contained in the colorant layer 3. But, the predetermined solvent contained in the colorant layer 3 refers to a residual solvent contained in the colorant layer 3. With respect to the identification of the residual solvent contained in the colorant layer 3, it will be described later.

"Colorant Dispersible in the Predetermined Solvent"

The colorant layer 3 contains a colorant 10x dispersible in the predetermined solvent. The term "colorant" used herein is a concept which also involves sublimable dyes, and pigments. There is no particular limitation on the colorant 10x dispersible in the predetermined solvent, and can be appropriately selected depending on the type of the predetermined solvent. Concretely, as long as the colorant 10x is dispersible to the predetermined solvent which is contained in the colorant layer 3, it may be any colorant.

As the colorant 10x dispersible in the predetermined solvent, any colorant can be appropriately selected from, for example, the sublimable dyes mentioned below and/or the pigments mentioned below, depending on the solvent contained in the colorant layer 3. Concretely, a predetermined solvent is selected at first, and then, a colorant may be selected from, for example, the sublimable dyes mentioned below and/or the pigments mentioned below, by a criterion whether it is dispersible to the predetermined solvent or not.

As the sublimable dye, for instance, diarylmethane based dyes; triarylmethane based dyes; thiazole based dyes; merocyanine dyes; pyrazolone dyes; methine based dyes such as pyrazolone methine and pyridone methine; indoaniline based dyes; indonaphthole based dyes; azomethine dyes such as acetophenone azomethine dyes, pyrazolo azomethine dyes, imidazol eazomethine dyes, imidazo azomethine dyes, and pyridone azomethine dyes; xanthene based dyes; oxazine based dyes; cyanostyrene based dyes such as dicyanostyrene dyes and tricyanostyrene dyes; thiazine based dyes; azine based dyes; acridine based dyes; benzeneazo based dyes; azo based dyes such as, pyridoneazo dyes, thiopheneazo dyes, isothiazoleazo dyes, pyrroleazo dyes, pyrazoleazo dyes, imidazoleazo dyes, thiadiazoleazo dyes, triazoleazo dyes, and disazo dyes; spiropyran based dyes; indolinospiropyran based dyes; fluoran based dyes; rhodaminelactam based dyes; naphthoquinone based dyes; anthraquinone based dyes; quinophthalone based dyes;

aminopyrazole based dyes; pyrazolotriazole based dye; styryl based dyes such as dicyano styryl and tricyano styryl; etc., can be enumerated.

Concretely, for instance, C. I. (Color index) Disperse Yellow 51, 3, 54, 79, 60, 23, 7, 141, 201, 231; C. I. Disperse Blue 24, 56, 14, 301, 334, 165, 19, 72, 87, 287, 154, 26, 354; C. I. Disperse Red 135, 146, 59, 1, 73, 60, 167; C. I. Disperse Orange 149; C. I. Disperse Violet 4, 13, 26, 36, 56, 31; C. I. Solvent Yellow 56, 14, 16, 29, 93; C. I. Solvent Blue 70, 35, 63, 36, 50, 49, 111, 105, 97, 11; C. I. Solvent Red 135, 81, 18, 25, 19, 23, 24, 143, 146, 182; C. I. Solvent Violet 13; C. I. Solvent Black 3; C. I. Solvent Green 3; and the like may be enumerated. As the sublimable dye, from the viewpoint of having a light resistance and also a high intensity, the quinophthalone based dyes, anthraquinone based dyes are preferable, and further, the quinophthalone based dyes are particularly preferable.

As the quinophthalone based dyes (colorant), quinophthalone based colorants represented by the following formula 1 are preferred. By containing a quinophthalone based dye represented by the formula 1 in the colorant layer 3, it becomes possible to improve the light resistance and the sharpness of a printed article that is formed using the thermal transfer sheet of the first embodiment. With respect to the quinophthalone based colorant represented by Formula 1, when both X and $R^1$ are a hydrogen atom, individually, it represents a Disperse Yellow 54. Also, when X is Br, and $R^1$ is hydrogen atom, it represents Disperse Yellow 64. As quinophthalone-based colorants represented by the following formula 1, Disperse Yellow 149, and further, the quinophthalone dyes described in JP Hei 10-287818 A and the like can be enumerated. The related content of this reference are incorporated herein by reference.

[Chem. 3]

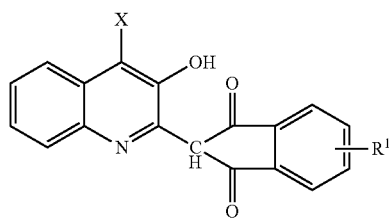

Wherein, X represents a hydrogen atom or a halogen atom, $R^1$ represents a hydrogen atom, an alkyl group or derivative thereof having 1 to 5 carbon atoms, an acyl group including an alkyl group or a benzoic ring and having a total carbon number of 6 to 10.

As the sublimable dye, it is also possible to use any commercially available product as-is. For instance, as a yellow dye, Holon brilliant yellow-S-6GL (manufactured by Sandoz, Disperse Yellow 231), MACROLEX Yellow 6G (manufactured by Bayer, Disperse Yellow 201); as a magenta dye, MS-Red-G (manufactured by Mitsui Toatsu Chemicals, Inc., Disperse Red 60), Macrolex Red Violet R (manufactured by Bayer, Disperse Violet 26); as a cyan dye, Kayaset Blue 714 (manufactured by Nippon Kayaku Co., Ltd., Solvent Blue 63), Holon Brilliant Blue S-R (manufactured by Sandoz, Disperse Blue 354), Waxoline Blue AP-FW (manufactured by ICI, Solvent Blue 36); etc., are exemplified.

As the sublimable dye dispersible in the predetermined solvent, it is possible to use one kind of the sublimable dye singly, or to use in any mixture of two or more of them. As a dispersible colorant in a predetermined solvent, the sublimable dye(s) may also be used in combination with pigment(s). It can also be used in combination of two or more pigments. Here, the colorant layer 3 has to contain at least one of the color material(s) 10x dispersible in any solvent(s) which is contained in the colorant layer 3, provided that none of the solvents included in the colorant layer 3 can dissolve the dispersible colorant 10x. This is because, even in the case that the colorant layer 3 contains a predetermined solvent and a colorant 10x dispersible to the predetermined solvent, if the colorant 10x can be dissolved by any other solvent included in the colorant layer 3, the dispersible colorant 10x would exist in its dissolved condition in the coating liquid for the colorant layer as a consequence.

When pigment(s) is used as the colorant 10x dispersible in a predetermined solvent, the pigment(s) may be suitably selected from known organic or inorganic pigments. As the pigment, the one which has a sufficient color density, and is not easily discolored or faded by light, heat or the like, is preferable. As the color of the pigments, it is possible to use various colors of the coloring agents, without being limited to cyan, magenta, yellow and black.

As examples of the pigment, azo based pigments, phthalocyanine based pigments, quinacridone based pigments, perylene-perinone based pigments, isoindolinone based pigments, isoindoline based pigments, dioxazine based pigments, quinophthalone based pigments, diketopyrrolopyrrole based pigments, anthraquinone based pigments, thioindigo based pigments, metal complex based pigments and the like may be enumerated. Among these organic pigments, C. I. Pigment Yellow 138, C. I. Pigment Yellow 150, C. I. Pigment Green 7, C. I. Pigment Green 36, C. I. Pigment Red 122 and C. I. Pigment Violet 19 are desirable from the viewpoint of having high luminance.

Although the quinophthalone-based colorant represented by the above formula 1 which mainly has a hue of yellow, it is preferable to use a colorant (pigment) represented by the following formula 2 to the colorant layer, in addition to the above mentioned quinophthalone-based colorants represented by the above formula 1, from the viewpoint of improving the dispersibility of the colorants and the stability of the ink, and the viewpoint of preventing the contamination due to the transfer of the colorants from the colorant layer and the retransfer of this transferred colorants.

[Chem. 4]

Formula 2

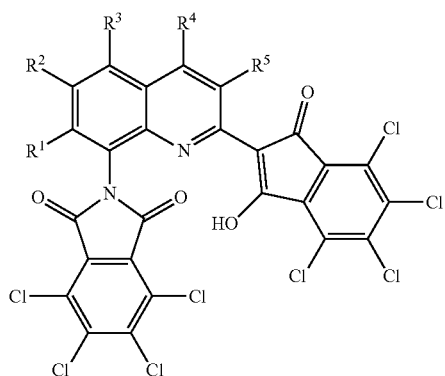

wherein, each of $R^1$-$R^5$ represents independently a hydrogen atom, an aryl group or derivative thereof having 1 to 5 carbon atoms, or a sulfonated derivative having at least one sulfonic acid group (—SO$_3$H) or sulfonamide group.

Among the colorants (pigments) represented by the above formula 2, the ones wherein at least one of R$^1$-R$^5$ is the sulfonated derivative having at least one sulfonic acid group (—SO$_3$H) or sulfonamide group are preferable. Furthermore, a part of or all of the sulfonic acid group(s) may take a salt form by salifying with amine, ammonium hydroxide, chloride, bromide, etc., or a metal. A derivative of the colorant represented by Formula 2 is represented by the following formula 3.

Formula 3

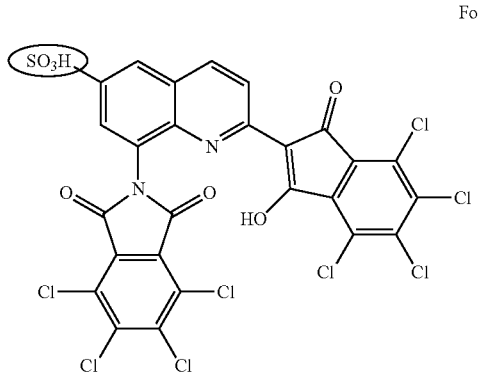

It is preferable to use the sulfonated derivative represented as above formula as the colorant, because it can brings many advantages such as, to enhance the adhesiveness with the substrate sheet of the thermal transfer sheet, to enhance the dispersibility of the colorants in the colorant layer, etc. Here, with respect to the sulfonated derivative, albeit at a hue of yellow, since its hue is slightly changed as compared with the hue of quinophthalone-based colorants represented by the above formula 1, it is preferable to use in a small proportion, that is, to add at not more than 15% (by weight) of the total of colorants, from the viewpoint of the color reproduction.

Further, the thermal transfer sheet 1 of the first embodiment is characterized in that the colorant layer 3 contains a dispersant, and the dispersant is one or more kinds of dispersants selected from the group consisting of polyether-based dispersants, graft type polymer dispersants, acryl-based block type polymer dispersants, urethane-based polymer dispersants and azo-based dispersants. Hereinafter, these dispersants may be referred to collectively as "specific dispersants", occasionally.

As the polyether-based dispersants, for example, polyether based carboxylic acids, polyether based phosphoric acids, polyether based phenols, and the like can be enumerated. As commercially available products of the polyether-based dispersants, for instance, DISPARLON DA234, DISPARLON DA325, (trade names of Kusumoto Chemicals, Co., Ltd.), Solsperse 20000 (The Lubrizol Corporation), etc., may be enumerated.

The graft-type polymer dispersant denotes a polymer having a structure wherein branch polymer segment(s) is grafted to a main polymer segment which has a plural number of functional groups such as basic groups, for instance, a polymer of which the main polymer segment is polyallylamine and the branch polymer segment is ε-caprolactone ring-opening polymerized polymer may be enumerated. As the dispersant of the above graft-type polymer, for instance, Ajisper PB821, Ajisper PB822, Ajisper PB823, Ajisper PB824, Ajisper PB827, Ajisper PB880, and mention may be made of Ajisper PB881 (manufactured by Ajinomoto Fine-Techno Co., Ltd.), etc., may be enumerated. As the graft-type polymer dispersant, it is possible to use one kind of the dispersants singly, or to use in any combination of two or more of them.

As the acryl based block type polymer dispersant, those which has, as the main chain structure, for example, methacryl based resin or acryl based resin or the like, may be enumerated. Especially, dispersants of methacrylic or acrylic block type polymer including tertiary amino groups are preferred. The weight average molecular weight (Mw) of the block type polymer dispersant is preferably in the range of not less than 500 or not more than 20 000, more preferably, in the range of not less than 1,000 and not more than 15,000, still more preferably, in the range of not less than 3000 and not more than 12000. When using the acryl based block type polymer dispersant having a weight average molecular weight within the above preferred range, it is possible to achieve both the wettability and dispersion stability to the colorant at the initial stage of dispersion to disperse uniformly the colorant. Incidentally, the weight average molecular weight (Mw) used herein denotes a value measured by the gel permeation chromatography (GPC) and calibrated with polystyrene standard. As the dispersant of the methacrylic or acrylic block type polymer including tertiary amino groups, for instance, Disperbyk-2000, Disperbyk-2001, BYK-LPN6919, BYK-LPN21116, BYK-LPN21324 (manufactured by BYK Additives & Instruments) may be enumerated. As the acryl based block type polymer dispersant, it is possible to use one kind of the dispersants singly, or to use in any combination of two or more of them.

As the urethane based polymer dispersant, an urethane based block-type polymer dispersant is preferable used. The weight average molecular weight (Mw) of this block type polymer dispersant is preferably in the range of not less than 4000 and not more than 300,000, more preferably not less than 5,000 and not more than 200,000, further preferably, in the range of not less than 6,000 and more than 100,000, and furthermore preferably, in the range of not less than 10,000 and not more than 50,000. As the above mentioned block type polymer dispersant, for example, "BYK-161, BYK-162, BYK-163, BYK-164, BYK-167", manufactured by BYK Additives & Instruments; "EFKA 4047, 4050, 4010, 4165", manufactured by BASF; etc. may be enumerated. As the urethane based polymer dispersant, it is possible to use one kind of the dispersants singly, or to use in any combination of two or more of them.

As the azo-based dispersant, azo pigment derivatives may preferably be used. As the azo pigment derivative, for instance, Solsperse 22000 (manufactured by The Lubrizol Corporation) may be enumerated. As the azo based dispersant, it is possible to use one kind of the dispersants singly, or to use in any combination of two or more of them.

Although there are many dispersants for dispersing the colorant 10x dispersible to the predetermined solvent is present a number, but in the present invention, since the colorant layer 3 contains the "specific dispersant", it is possible to keep the dispersion stability of the colorant 10x dispersible to the predetermined solvent at a high level. Incidentally, when the colorant layer contains a dispersant other than the "specific dispersant", its preventing ability for kick and scumming, light resistance, printing quality of a printed article to be formed is lowered, as compared to those obtained by the colorant layer 3 containing the "specific dispersant". As the "specific dispersant", it is possible to use one kind of the dispersants singly, or to use in any combination of two or more of them. The content of the "specific dispersant" is usually in the range of not more than 100 parts by weight, preferably in the range of 0.5 to 100 parts by weight, more preferably, 1 to 70 parts by weight, and particularly preferably, 10 to 50 parts by weight, on the basis of 100 parts by weight of the colorants. When the content of "a specific dispersant" is more than 100 parts by weight, there is a possibility that the sharpness may be impaired. On the other hand, when the content of the "specific dispersants" is too small, there is a possibility that the functions as the "specific dispersants" cannot be sufficiently exhibited. Next, preferred combinations of the colorant and the "specific dispersant" is the colorant layer containing 3 will be described by taking some examples. Incidentally, the colorants and the "specific dispersants" contained in the colorant layer 3 are not limited to the following combinations. As long as the condition that the colorant layer 3 contains a predetermined solvent, a colorant dispersible to the predetermined solvent, a "specific dispersant", and a binder resin is satisfied, it is possible to suppress the occurrence of the kick and/or the scumming, and the lowering of print density in the highlight portion in the thermal transfer sheet provided with the colorant layer, and also possible to improve durability such as light resistance of the printed article to be formed by the thermal transfer sheet, and to obtain a high quality image.

The colorant layer 3 of a preferred example contains the quinophthalone-based colorant represented by the above formula 1, the colorant represented by the above formula 2, the acryl based block type polymer dispersant, the predetermined solvent, and a binder resin. In other words, the colorant layer 3 of this preferred example is a colorant layer which is formed by using a coating liquid for colorant layer which includes the quinophthalone-based colorant represented by the above formula 1, the colorant represented by the above formula 2, the acryl based block type polymer dispersant, the predetermined solvent, and a binder resin. According to the coating liquid for colorant layer which includes the quinophthalone-based colorant represented by the above formula 1, the colorant represented by the above formula 2, the acryl based block type polymer dispersant, the predetermined solvent and the binder resin, it is possible to disperse the quinophthalone-based colorant represented by the above formula 1 with a small particle diameter, concretely, with a particle diameter of not more than 200 nm, in the coating liquid for colorant layer. Therefore, by constituting a thermal transfer sheet comprising a colorant layer formed by using the coating liquid for colorant layer as above mentioned, in addition to the above effects, it becomes possible to form an image of high concentration, and also possible to improve the adhesion between the substrate sheet 2 and the colorant layer 3.

The colorant layer 3 of another preferred example contains the quinophthalone-based colorant represented by the above formula 1, a predetermined solvent, the urethane based polymer dispersant, the azo based dispersant, and a binder resin. In other words, the colorant layer 3 of this preferred example is a colorant layer which is formed by using a coating liquid for colorant layer which includes the quinophthalone-based colorant represented by the above formula 1, a predetermined solvent, the urethane based polymer dispersant, the azo based dispersant, and a binder resin. In such the coating liquid for colorant layer which includes the colorant and the dispersants in the above mentioned combination, it is also possible to disperse the quinophthalone-based colorant represented by the above formula 1 with a particle diameter of not more than 200 nm, in the coating liquid for colorant layer, same as the colorant layer of the above mentioned first example.

With respect to the blending ratio of the urethane based dispersant and the azo-based dispersant, although there is no particular limitation, it is preferable to be in the range of about 9:1 to about 1:9, in their weight ratio.

The colorant layer 3 of further another preferred example is a colorant layer which is formed by using a coating liquid for colorant layer which is prepared by a "specific preparation method of the coating liquid for colorant layer". The "specific preparation method of the coating liquid for colorant layer" is a method where a dispersion containing the colorant in the predetermined solvent is prepared by using the "specific dispersant" under a condition of containing no or a very small amount of the binder resin, and thereafter, a binder resin is added to the obtained dispersion as post-addition in order to obtain the coating liquid for colorant layer". According to the coating liquid for colorant layer prepared by this preparation method, it is possible to disperse the colorant with a small particle diameter in a short time, as compared with the coating liquid for colorant layer which is prepared by dispersing the colorant in the predetermined solvent with using the "specific dispersant" under the presence of the binder resin.

"Determination Method for Dispersibility of Colorant to Predetermined Solvent"

By the following method, it is possible to determine whether a colorant of interest to be contained in the colorant layer can be dispersed in the predetermined solvent or not. To the predetermined solvent, the colorant of interest is added so as to be an amount of 2 w/v %, then the colorant added solvent is heated for 1 hour at 50° C. with stirring. Then, the resulting liquid is left standing for 60 hours at 25° C., and after the leaving, the liquid is observed visually about the presence or absence of precipitation of the colorant of interest. When precipitation of the colorant of interest does not observed visually, the colorant of interest can be determined to be a colorant soluble in a predetermined solvent. On the other hand, when precipitation of the colorant of interest is observed visually, the colorant of interest can be determined to be a colorant insoluble to the predetermined solvent, in other words, a colorant dispersible to the predetermined solvent. With respect to the sublimable dye, it is possible to determine the dispersibility in the same manner. With respect to the colorant layer of the thermal transfer sheet of the second embodiment described later, and the colorant layer of the thermal transfer sheet of the third embodiment, it is also possible to determine the dispersibility in the same manner.

"Determination Method for Colorant, Residual Solvent"

For instance, by the following method, it is possible to determine whether a thermal transfer sheet of interest (hereinafter, referred to as target thermal transfer sheet) satisfies the matters specifying the thermal transfer sheet of the first embodiment or not. First, the colorant layer of the target thermal transfer sheet is analyzed in order to identify the colorant component contained in the colorant layer. As the identification method of the colorant components, any conventionally known analytical method such as the nuclear magnetic resonance spectroscopy, IR spectroscopy or the like is applicable.

Then, the kind of the solvent remaining in the colorant layer is determined. As the identification method of the kind of the solvent, for example, the gas chromatography is applicable. In the identification of the kind of the solvent by the gas chromatography, for instance, a gas chromatography analyzer such as Gas Chromatography GC14-A, manufactured by Shimadzu Corporation, and the like can be utilized. Incidentally, in order to eliminate the influence of the solvents which have been contained in the substrate sheet, back face layer, and/or any arbitrary layers in the target thermal transfer sheet, it is necessary to analyze to the layer corresponding to the colorant layer of the target thermal transfer sheet on the identification of the kind of the solvent. Concretely, when the kind of the solvent remaining in the colorant layer is determined by using the gas chromatography method, it is important to take only a part of the layer corresponding to the colorant layer of the target thermal transfer sheet and carry out the analyze to the portion.

When at least one of the identified colorant components as mentioned above is the colorant component dispersible in the identified solvent as mentioned above, and the above "specific dispersant" is contained as the dispersant, the target thermal transfer sheet can be judged as being satisfying the matters specifying the thermal transfer sheet of the first embodiment. Using the "determination method for dispersibility of colorant to predetermined solvent", it is possible to identify whether the identified colorant component is soluble or dispersible in the identified solvent.

The colorant layer 3 may contain other optional additives, for instance, a releasing agent for improving releasability from the receiving layer of the thermal transfer-image receiving sheet, an antistatic agent, an organic or inorganic filler for controlling the lubricity with the receiving layer, etc., in addition to the essential components, i.e., the binder resin, the predetermined solvent, the colorant dispersible to the predetermined solvent, and one or more kinds of dispersants selected from the group consisting of polyether-based dispersants, graft type polymer dispersants, acryl-based block type polymer dispersants, urethane-based polymer dispersants and azo-based dispersants.

As the release agent, for instance, silicone oils, polyethylene waxes, amide waxes, Teflon (registered trademark), surfactants such as fluorine based surfactants or phosphoric ester based surfactants may be exemplified. Although there is no particular limitation on the content of the release agent in the colorant layer, it is preferable to be in the range of not less than 0.1% by weight and not more than 10% by weight on the basis of the total solid content of the binder resin contained in the colorant layer. By incorporating the release agent in this range, even when the receiving layer does not contain a release agent, it is possible to sufficiently satisfy the releasing property between the colorant layer 3 and the receiving layer.

There is no particular limitation on the method of forming the colorant layer 3, and for instance, the colorant layer 3 can be formed by preparing a coating liquid for the colorant layer where the binder resin, the predetermined solvent, the colorant dispersible to the solvent, and the "specific dispersant", and any optionally added component(s) are used and the colorant is dispersed in the predetermined solvent, coating thus prepared coating liquid for colorant layer in accordance with a known coating procedure such as the gravure printing method, the screen printing method, the reverse roll coating printing method using a gravure plate, or the like, and then drying the coated solution. The coating amount of the coating liquid for colorant layer is not particularly limited, but usually, it is in the range of about 0.2 g/m$^2$-about 10 g/m$^2$ in term of the solid content.

(Back Face Layer)

As shown in FIG. 1, in the thermal transfer sheet of the first embodiment, a back face layer 5 may be provided on a backside surface of the substrate 1, that is, the surface which is different from another surface on which the colorant layer is provided, in order to prevent adverse effects such as sticking or wrinkles due to heat from the thermal head, to impart slipperiness to the thermal transfer printer or the like, and enhance transportability of the sheet therein. As the resin for forming the back face layer, any conventionally known resin may be used, for instance, thermoplastic resins such as polyester type resins, polyacrylic ester type resins, polyvinyl acetate type resins, styrene acrylate type resins, polyurethane type resins, polyolefin type resins such as polyethylene type resins and polypropylene type resins, polystyrene type resins, polyvinyl chloride type resins, polyether type resins, polyamide type resins, polyimide type resins, polyamide-imide type resins, polycarbonate type resins, polyacrylamide type resins, polyvinyl chloride resins, polyvinyl butyral resins, and polyvinyl acetal resins; and silicone-modified forms of these thermoplastic resins may be enumerated. Concretely, for example, polyvinyl butyral resins, polyvinyl acetoacetal resins, polyester resins, vinyl chloride-vinyl acetate copolymers, polyether resins, polybutadiene resins, styrene-butadiene copolymers, acryl polyols, polyurethane acrylates, polyester acrylates, polyether acrylates, epoxy acrylates, urethane or epoxy prepolymers, nitrocellulose resins, cellulose nitrate resins, cellulose acetopropionate resins, cellulose acetate butyrate resins, cellulose acetate hydrodiene phthalate resins, cellulose acetate resins, aromatic polyamide resins, polyimide resins, polyamide-imide resins, polycarbonate resins, and chlorinated polyolefin resins and the like may be enumerated.

As a slipping property-imparting agent to be added to the back face layer comprising above mentioned resin or to be overcoated on the back face layer, for instance, phosphoric acid esters, fatty acid esters, metallic soaps, waxes, silicone oils, graphite powders, silicone based graft polymers, fluorine containing graft polymers, acrylic silicone graft polymers, silicone polymers such as acrylic siloxanes and aryl siloxanes may be exemplified. However, it is preferable to be a layer which comprises a polyol such as a polyalcohol polymer compound, and a polyisocyanate compound and a phosphoric acid ester-based compound, and further, it is more preferably to further add a filler. Further, phosphate esters, fatty esters, metallic soaps, waxes, etc. may be also preferably used.

As the metal soaps, for instance, multivalent metallic salts of alkyl phosphoric esters, multivalent metal salts of fatty acids, metallic salts of alkyl carboxylic acid may be enumerated. As the metal soaps, the ones which are known in the art as additive for plastics may be used. Among them, zinc stearate and/or zinc stearyl are preferred.

As the phosphoric acid ester, for example, (1) phosphoric diesters or monoesters of saturated or unsaturated higher alcohols having a carbon number of 6 to 20, (2) phosphoric monoesters or diesters of polyoxyalkylene alkyl ethers or polyoxyalkylene alkyl allyl ethers, (3) phosphoric diesters or monoesters of alkylene oxide adducts (average addition molar number: 1-8) of the above mentioned saturated or unsaturated alcohols, (4) phosphoric monoesters or diesters of alkyl phenols or alkyl naphthols which have an alkyl group having a carbon number of 8-12, are enumerated. As the saturated and unsaturated higher alcohols for the above (1) and (3) compounds, for example, cetyl alcohol, stearyl alcohol, oleyl alcohol, etc., are enumerated. As the alkyl phenol for the above (3) compounds, for example, nonyl phenol, dodecyl phenol, diphenyl phenol, etc., are enumerated.

There is no particular limitation about the method for forming the back face layer. The back face layer 3 may be formed by dissolving or dispersing the above exemplified resin, and optionally, other ingredients such as lubricant into a suitable solvent; coating thus prepared coating liquid onto the substrate 2 in accordance with a known coating procedure such as the gravure printing method, the screen printing method, the reverse roll coating method using a gravure plate, or the like; and then drying the coated liquid. As the solvent to be used for preparing the coating liquid, for instance, water, toluene, methyl ethyl ketone, ethanol, isopropyl alcohol, cyclohexane, dimethyl formamide, ethyl acetate, etc., can be enumerated. The coating amount of the coating liquid for back face layer is not limited as long as the anti-fusion property, the lubricity or the like is fulfilled, and usually, it is in the range of about 0.1 g/m$^2$-about 3 g/m$^2$ in term of the solid content.

(Back Face Primer Layer)

Further, in the thermal transfer sheet of the first embodiment, a back face primer layer (not shown) can also be provided between the substrate sheet 2 and the back face layer 5. The back face primer layer is a layer provided for improving the adhesion between the substrate sheet 2 and the back surface layer 5, and it is an optional layer. As the back face primer layer, for example, polyester resins, polyurethane resins, acrylic resins, polycarbonate resins, polyamide resins, polyimide resins, polyamideimide resins, vinyl chloride-vinyl acetate copolymers, polyvinyl butyral resins, polyvinyl alcohol resins, polyvinyl pyrrolidone resins and the like may be enumerated. It may also contain a conductive material for imparting appropriate conductivity. For example, sulfonated polyaniline, carbon particles, silver particles, gold particles, and the like may be enumerated.

As described above, the thermal transfer sheet according to the first embodiment of the present invention is fairly explained. However, without deviating from the scope and the spirit of the first embodiment of the present invention, the thermal transfer sheet can takes various modified embodiments other than the ones as disclosed above. For example, in the constitution shown in FIG. 1, it is possible to provide the above-mentioned colorant layer 3 and a transferable protective layer (not shown) are provided on the same surface of the substrate sheet 2 as being frame sequentially in order to manufacture an integral type thermal transfer sheet. In addition, it is also possible to provide colorant layers having each individual hue different from each other on the same surface of the substrate sheet 2 as being frame sequentially. For instance, it is possible to provide a yellow colorant layer, a magenta colorant layer, and a cyan colorant layer on the substrate sheet 2 so as to the dye layers are layered in parallel on the substrate sheet 2 across the surface of the substrate sheet, as being frame sequentially. In this case, as long as at least one colorant layer of these colorant layers provided as being frame sequentially is the colorant layer 3 as above described, it can be embraced in the first embodiment of the present invention.

<<Coating Liquid for Colorant Layer of the First Embodiment>>

Next, the coating liquid for colorant layer of the first embodiment of the present invention will be described below. The coating liquid for colorant layer of the first embodiment is the coating liquid for forming the above explained colorant layer of the thermal transfer sheet of the first embodiment, and is characterized in that it contains a predetermined solvent, a colorant dispersible to the predetermined solvent, a dispersant, and a binder resin.

The coating liquid for colorant layer of the first embodiment is further characterized in that the colorant dispersible in the predetermined solvent is dispersed in a particle size of not less than 50 nm and not more than 300 nm in the coating liquid for colorant layer; and, the dispersant is the above mentioned "specific dispersant(s)", i.e., one or more kinds of dispersants selected from the group consisting of polyether-based dispersants, graft type polymer dispersants, acryl-based block type polymer dispersants, urethane-based polymer dispersants and azo-based dispersants. With respect to the coating liquid for colorant layer of the first embodiment, although the particle size of the colorant dispersible to the predetermined solvent is defined as above, the particle size of the colorant used herein denotes the average dispersed particle diameter of the colorant in the coating liquid for colorant layer in the first embodiment. Concretely, it is a dispersed particle diameter of the colorant particles dispersed in a dispersion medium of the coating liquid, and it is determined by a laser light scattering particle size distribution meter. With respect to the measurement of the particle diameter by the laser light scattering particle size distribution meter, the coating liquid to be measured is appropriately diluted to a concentration that is capable of being measured by the laser light scattering particle size distribution meter (for example, 1000-fold dilution, etc.) with the same predetermined solvent as being contained in the coating liquid, and then the particle diameter can be determined by using the laser light scattering particle size distribution analyzer (for example, Nanotrac particle size distribution analyzer UPA-EX150, manufactured by Nikkiso Co. Ltd.) in accordance with the dynamic light scattering method at 23° C. The average dispersed particle diameter used herein is a volume average particle size.

Further, with respect to the coating liquid for colorant layer of the first embodiment, the "colorant in the coating liquid for colorant layer are dispersed" denotes the condition that no precipitation of the colorant particles is observed visually after 120 hours (5 days) standing of the coating liquid for colorant layer at 20-25° C. With respect to the coating liquid for colorant layer of the first embodiment, it is defined that the colorant dispersible to the predetermined solvent is dispersed in a particle diameter of not less than 50 nm and not more than 300 nm in the coating liquid for colorant layer. This is because, if the particle diameter of the colorant dispersed is less than 50 nm, there is a tendency that the colorant caused gelation due to an interaction with the binder resin, and the coating liquid owns the same properties as the state of the colorant is dissolved, and as a result, background stain (stains at the non-printing portion is caused) is likely to occur during printing. On the other hand, if the particle diameter of the colorant dispersed is more than 300 nm, there is a tendency that the precipitation of the colorant is easily caused by variation of the coating liquid for colorant layer with time, and, also the transfer sensitivity becomes insufficient, and the desired print density cannot be obtained.

In the coating liquid for colorant layer of the first embodiment, it is preferable that the colorant dispersible in the predetermined solvent is in the range of 50-300 parts by weight, and more desirably, in the range of 85-250 parts by weight, on the basis of 100 parts by weight of the binder resin. Furthermore, it is preferable that the colorant dispersible in the predetermined solvent is in the range of 0.5-20% by weight on the basis of the total weight of the coating liquid for colorant layer of the first embodiment. Furthermore, the total weight of the colorant dispersible in the predetermined solvent, the binder resin and the "specific dispersant(s)" to the total weight of the coating liquid for colorant layer of the first embodiment, that is, the solid content is preferably in the range of 2-40% by weight, and more preferably in the range of 5-35% by weight. Incidentally, when the coating liquid for the colorant layer of the first embodiment contains two or more kinds of colorants dispersible in the predetermined solvent, both the content and the solid content of the above colorant represent the total amount of the individual color materials.

It is preferable that as the colorant dispersible in the predetermined solvent, a dye such as Disperse Yellow 54, and a pigment represented by the Formula 3 are mixed and contained in the coating liquid for colorant layer of the first embodiment, form the view point that the ink becomes good, and the printed articles becomes excellent in durability such as light resistance, and it becomes possible to enhance the transfer sensitivity during printing. The colorant layer of the thermal transfer sheet is a layer containing a colorant for thermal transition by heating with a thermal head or the like, by sublimation or the like, and thus, it is preferable to mix the pigment to the above mentioned dye as the main ingredient. In detail, when using the pigment, it is preferable to mix the dye and the pigment in a range of dye/pigment=7/3 to 9.5/0.5 (weight ratio).

The details for the predetermined solvent the colorant dispersible in the predetermined solvent, the "specific dispersant(s)", and the binder resin, which are essential components of the coating liquid for colorant layer of the first embodiment, are the same with those described above in the explanation about the colorant layer of the thermal transfer sheet. Further, as a preferred combination of the "specific dispersant(s)" and the colorant dispersible to the predetermined solvent in the coating liquid for colorant layer of the first embodiment, the combinations described above in the explanation about the colorant layer 3 of the thermal transfer sheet of the first embodiment can be cited. In the coating liquid for colorant layer of the first embodiment, it is possible to add optionally any of various additives known in the art, if necessary, in addition to the essential components. As the optional additives, for instance, polyethylene wax, silane coupling agent, organic minute particles, inorganic minute particles and the like may be enumerated.

"First Method for Preparation of Coating Liquid for Colorant Layer"

The coating liquid for colorant layer of the first embodiment can be prepared in accordance with a known preparation method in the art using, for example, a paint shaker, a propeller type stirrer, a dissolver, a homomixer, a ball mill, a bead mill, a sand mill, a biaxial roll mill, a triaxial roll mill, an ultrasonic dispersing machine, a kneader, a line mixer, a biaxial extruder or the like. As one approach to preparing the coating liquid for colorant layer of the first embodiment, in the case of using a bead mill, or a ball mill, as for the beads, the balls to be used, glass, ceramic, steel, zirconia and the like may be enumerated. Among them, zirconia beads are especially desirable from the viewpoint of hardness, wear resistance, specific gravity and particle size. As the diameter of the beads, it is preferable to be in the range of 0.05-2.0 mm, and particularly, it is preferable to select the bead diameter depending on the initial particle diameter of the colorant.

"Second Method for Preparation of Coating Liquid for Colorant Layer of First Embodiment"

Further, as another method for preparing the coating liquid for colorant layer of the first embodiment, there is a method where, at a high shear rate, the colorant dispersible to the predetermined solvent, the "specific dispersant(s)", and a lump of the binder resin are kneaded, then the predetermined solvent is added, and the colorant dispersible to the predetermined solvent is dispersed in the added predetermined solvent with using a paint shaker. For instance, an ink which underwent dispersing treatment by using Ultra Visco Mill UVM-2, manufactured by AIMEX Co., Ltd., with zirconia beads (average diameter of 0.3 mm) at a rotation rate of 1000 rpm for 10 hours, and a colorant dispersible to the predetermined solvent, "specific dispersant(s)", a binder resin and a solvent are kneaded by using a biaxial roll mil, manufactured by Kansai Roll Co., Ltd., under the conditions of roll temperature of 20° C., roll rotation rate for front roll of 20 rpm, and roll rotation rate for rear roll of 24 rpm, and then the solvent is further added to kneaded product, and they underwent dispersion using a paint shaker, in order to prepare the coating liquid for colorant layer of the first embodiment. With respect to both of the coating liquids for colorant layer of the first embodiment which were prepared in accordance with either one of the above two methods, it has been confirmed that the particle size distribution of the colorant in the coating liquid is in the range of 50 nm-300 nm in the diameter on the measurement in accordance with the above mentioned measurement method of the particle size distribution.

"Method for Preparation of Coating Liquid for Specific Colorant Layer (Third Method for Preparation of the Coating Liquid for Colorant Layer of the First Embodiment)"

In the above two methods, in the presence of the binder resin, by using the "specific dispersant(s)", the colorant dispersible in the predetermined solvent is dispersed in the predetermined solvent. However, depending on the type of the binder resin contained in the coating liquid for colorant layer of the first embodiment, the binder resin may interfere in the dispersibility of the colorant owing to the "specific dispersant(s)". Thus, in the "method for preparation of coating liquid for specific colorant layer", in order to sufficiently exhibit the dispersibility of the colorant owing to the "specific dispersant(s)", under the condition that no binder resin or a little amount of binder resin exists, a dispersion where the colorant is dispersed in the predetermined solvent is prepared by using the "specific dispersant(s)". Then, the binder resin, or a liquid containing the binder resin is post-added to the above mentioned dispersion, in order to prepare the coating liquid for colorant layer which contains the predetermined solvent, the colorant dispersible in the predetermined solvent, the "specific dispersant(s)", and a binder resin. According to this preparation method, it is possible to disperse the colorant into the predetermined solvent, under the condition of being free from, or receiving little extent of, the influence of the binder resin which becomes a factor of interfering in the dispersibility of the colorant owing to the "specific dispersant". Thus, as compared with the above mentioned two methods, it is possible to allow the colorant to exist with a smaller particle size in the finally prepared coating liquid for colorant layer of the first embodiment. This preparation method can be carried out by appropriately selecting and using procedures in the above mentioned two methods, except the points that the colorant undergoes dispersing under the condition that the binder resin does not exist, or exists in a small amount, and that the binder resin is post-added after the colorant has been dispersed.

The coating liquid for colorant layer of the first embodiment, in addition to the above essential components, may contain any optional ingredient(s).

« Method of Manufacturing Thermal Transfer Sheet of the First Embodiment »

Next, the method of manufacturing the thermal transfer sheet of the first embodiment of the present invention will be explained. The method of manufacturing the thermal transfer sheet of the first embodiment is characterized in that it comprises a colorant layer forming step where a coating liquid for colorant layer is applied onto a surface of a substrate sheet to form a colorant layer; wherein the coating liquid for colorant layer used in the colorant layer forming step contains a predetermined solvent, a colorant dispersible in the predetermined solvent, a dispersant and a binder resin; wherein the colorant dispersible in the predetermined solvent is dispersed in a particle size of not less than 50 nm and not more than 300 nm in the coating liquid for colorant layer; and, wherein the dispersant is one or more kinds of dispersants selected from the group consisting of polyether-based dispersants, graft type polymer dispersants, acryl-based block type polymer dispersants, urethane-based polymer dispersants and azo-based dispersants.

(Colorant Layer Forming Step)

As the coating liquid for colorant layer used in the colorant layer forming step, the coating liquid for the colorant layer of the first embodiment described above can be used as-is, thus the detailed description thereof will be omitted here.

There is no particular limitation on the coating method of the coating liquid for colorant layer, and for instance, it is possible to select appropriately and use any known method such as gravure coating, roll coating method, screen printing method, reverse roll coating method using a gravure plate, etc. There is no particular limitation on the coating amount of the coating liquid for colorant layer, but usually, it is in the range of about 0.2 g/m²-about 10 g/m² in terms of solid content.

The method of manufacturing a thermal transfer sheet of the first embodiment may include optional step(s) other than the above colorant layer forming step. For example, it may include a back face layer forming step that forms the back face on another surface of the substrate sheet, a step for forming a back face primer layer between the substrate sheet and the back face layer.

« Method of Manufacturing Thermal Transfer Sheet of the Second Embodiment »

Next, a method of manufacturing a thermal transfer sheet of the second embodiment of the present invention will be explained, while the superiority of the thermal transfer sheet which is manufactured by the manufacturing method of the second embodiment will be referred.

Figure 4:
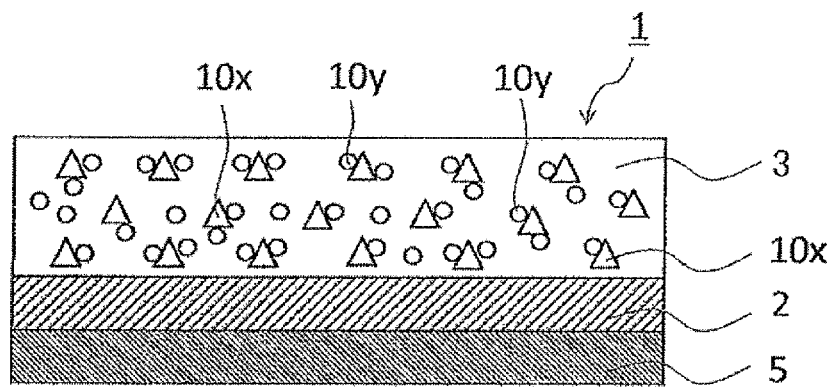
FIG. 4 is a schematic sectional view showing an example of a thermal transfer sheet of the second embodiment.

FIG. 4 is a schematic cross-sectional view of a thermal transfer sheet which is manufactured by the manufacturing method of the second embodiment. In the manufacturing method of the second embodiment, a colorant layer 3 is formed on a substrate sheet 2 by using a coating liquid for colorant layer which contains a predetermined solvent, a sublimable dye soluble in the predetermined solvent, a colorant dispersible in the predetermined solvent, and a binder resin. In other words, the colorant layer 3 is formed by using a coating liquid which contains a binder resin, and wherein a sublimable dye 10y is dissolved in the predetermined solvent and a colorant 10x is dispersed in the predetermined solvent.

Density of an image formed by thermal transfer recording method is believed to be closely related to the thermal migration of the sublimable dye contained in the colorant layer, and thus it is important to improve the thermal migration of the sublimable dye contained in the colorant layer in order to prepare the colorant layer capable of forming a high density image. As a method for improving the thermal migration of the sublimable dye, a method of forming a colorant layer which uses a coating liquid where a sublimable dye is dissolved in the solvent may be enumerated. According to the colorant layer formed by this method, it is possible to allow the sublimable dye to present at its molecular level in the colorant layer, and thus it is possible to improve the thermal migration of the sublimable dye in the colorant layer. On the other hand, with respect to a colorant layer formed by using a coating liquid prepared by dispersing the sublimable dye in a solvent in place of the coating liquid obtained by dissolving the sublimable dye in a solvent, since the sublimable dye presents in its state of having a certain degree of particle diameter in the colorant layer, the thermal migration of the sublimable dye is forced to decrease, and it becomes difficult to perform high-density image formation.

As described in the thermal transfer sheet of the first embodiment, in the case of forming the colorant layer 3C by using the coating liquid prepared by dissolving the sublimable dye 10y in the predetermined solvent (see FIG. 3), it is impossible to prevent the occurrence of the kick and the scumming.

Moreover, in order to prevent localization of the sublimable dye to the interfaces, the localization being the cause of occurrence of the kick and the scumming, it is preferable to form a colorant layer by using a coating liquid wherein a colorant is dispersed in a solvent. Therefore, in the method of manufacturing the thermal transfer sheet of the first embodiment as mentioned above, by forming the colorant layer with the coating liquid for colorant layer which includes a predetermined solvent and a colorant dispersible to the predetermined solvent, the occurrences of the kick and the scumming are repressed. Furthermore, in the method of manufacturing the thermal transfer sheet of the first embodiment, by containing the "specific dispersant(s)" in the coating liquid for colorant layer, it is plotted to improve the light resistance, and to repress the lowering of the printing density at the highlight portion, while repressing the occurrences of the kick and the scumming.

Incidentally, in order to obtain a colorant layer which can form a high density image, while repressing the occurrences of the kick and the scumming, it is preferable to present the colorant at its molecular level in the colorant layer. When the colorant layer is formed by using the coating liquid for colorant layer where the colorant is dispersed in the solvent, the colorant 10x comes to be in a condition of showing a certain degree of the particle diameter in the colorant layer 3. Thus, it is impossible to sufficiently enhance the thermal migration of the colorant, and it is inferior in the density to the colorant layer which is formed by using the coating liquid where the sublimable dye 10y is dissolved in the solvent (See FIG. 3).

Therefore, in order to obtain a thermal transfer sheet capable of forming an image of a higher density, while preventing the occurrences of the kick and the scumming, the method for manufacturing the thermal transfer sheet of the second embodiment is characterized in that it comprises a colorant layer forming step where a coating liquid for colorant layer is applied onto a surface of a substrate sheet to form a colorant layer; and the coating liquid for colorant layer contains a predetermined solvent, a sublimable dye soluble in the predetermined solvent, and a colorant dispersible in the predetermined solvent. That is, the method is characterized in that the colorant layer is formed by using the coating liquid for colorant layer where the sublimable dye is dissolved in the predetermined solvent and the colorant is dispersed in the predetermined solvent. According to the manufacturing method of the thermal transfer sheet of the second embodiment having this feature, it is possible to manufacture a thermal transfer sheet which is capable of forming a high density image, while preventing the occurrences of the kick and the scumming.

The detailed mechanisms for the aspect that the thermal transfer sheet manufactured in accordance with the manufacturing method of the second embodiment plays the above effects have been not clarified well, but the localization of the sublimable dye to the interfaces is repressed in the colorant layer 3 which is formed in accordance with the manufacturing method of the second embodiment. Thus, it can be assumed that the occurrences of the kick and/or the scumming are repressed by that condition. Specifically, it can be assumed that the colorant 10x dispersed in the coating liquid for colorant layer plays a roll of repressing the localization of the sublimable dye 10y to the interfaces of the colorant layer 3, and thus the sublimable dye 10y can be present in its dispersed state in the colorant layer 3 which is formed in accordance with the manufacturing method of the second embodiment.

As a reason why the colorant 10x dispersed in the coating liquid for colorant layer plays a roll of repressing the localization of the sublimable dye 10y dissolved in the coating liquid for colorant to the interfaces of the colorant layer, the affinity of the sublimable dye 10y with the colorant 10x can be mentioned. According to the conventional method, when the colorant layer is formed by using a sublimable dye 10y dissolved in a coating liquid for colorant layer, the sublimable dye 10y comes to be localized toward free boundary (interface) as shown in FIG. 3. However, in the manufacturing method of the second embodiment, since the colorant 10x is dispersed in the coating liquid for colorant layer, it is inferred that it is possible to locate the sublimable dye 10 around the particles of the colorant 10x that are present in a dispersed state in the colorant layer 3 formed by the manufacturing method of the second embodiment, owing to the affinity of the colorant 10x with the sublimable dye 10y. Thus, as shown in FIG. 4, in the colorant layer 3 which is formed in accordance with the manufacturing method of the second embodiment, it is believed that the localization of the sublimable dye 10y to the interfaces is suppressed, and thus it becomes possible to allow the sublimable dye 10y to present in its distributed state in the colorant layer 3, and it becomes possible to prevent the occurrences of the kick and/or the scumming.

Further, in the manufacturing method of the second embodiment, since the colorant layer 3 is formed by using a coating liquid for colorant layer where the sublimable dye is dissolved in a solvent, it is possible to allow the sublimable dye to present at its molecular level in the colorant layer 3. Thus, while preventing the occurrences of the kick and/or the scumming, it is possible to form a high density image.

Even not according to this hypothetical mechanisms, the point that, when using the colorant layer which is formed by using the coating liquid where the sublimable dye 10y is dissolved in the predetermined solvent and the colorant 10x is dispersed in the predetermined solvent, it becomes possible to form a high density image, while repressing the occurrences of the kick and/or the scumming, is revealed from the results of Examples and Comparative Examples described later.

Hereinafter, each component used in the manufacturing method of the second embodiment, and each component contained in the coating liquid for colorant layer will be described.

As a substrate sheet used in the manufacturing method of the second embodiment, the substrate sheet as described in the above explanation of the thermal transfer sheet of the first embodiment can be used as-is, and thus, a detailed description thereof will be omitted here.

(Coating Liquid for the Colorant Layer in the Manufacturing Method of the Second Embodiment)

The coating liquid for colorant layer used in the manufacturing method of the second embodiment (hereinafter, it is referred to as "coating liquid for colorant layer of the second embodiment") contains a binder resin, a predetermined solvent, a sublimable dye dissolvable in the predetermined solvent, and a colorant dispersible in the predetermined solvent. That is, in the coating liquid for colorant layer of the second embodiment, the sublimable dye 10y is present in its dissolved state, and the colorant 10x is present in its dispersed state.

There is no particular limitation on the binder resin which is included in the coating liquid for colorant layer of the second embodiment, for example, it is possible to use the binder resins described in the above explanation of the colorant layer of the thermal transfer sheet of the first embodiment as-is, and thus, a detailed description thereof will be omitted here.

The "predetermined solvent" contained in the coating liquid for colorant layer of the second embodiment means a solvent which is possible to dissolve the sublimable dye, and is possible to disperse the colorant. There is no particular limitation for the predetermined solvent, for example, it is possible to appropriately select one from the solvents as described in the above explanation of the colorant layer of the thermal transfer sheet of the first embodiment, and use it. Thus, a detailed description thereof will be omitted here.

The coating liquid for colorant layer of the second embodiment may contain one kind of the solvent singly, alternatively, it may contain two or more solvents. For example, it is possible to use a solvent A capable of dissolving the sublimable dye in combination with a solvent B capable of dispersible the colorant. Here, the case of using the solvent A and the solvent B is applicable with the proviso that the solvent A capable of dissolving the sublimable dye cannot dissolve the colorant. Incidentally, since the sublimable dye is to be dissolved by the solvent A, the solvent B may be either capable of or incapable of dissolving the sublimable dye as long as it satisfies the condition that it can disperse the colorant. Further, the coating liquid for colorant layer of the second embodiment may further contain solvent(s) other than the solvent A and the solvent B, provided that at least one colorant contained in the coating liquid for colorant layer of the second embodiment is not dissolved in all of the solvent contained in the coating liquid for colorant layer of the second embodiment.

There is no particular limitation on the "sublimable dye dissolvable in the predetermined solvent" which is contained in the coating liquid for colorant layer of the second embodiment, and it can be appropriately selected depending on the kind of the predetermined solvent contained in the coating liquid for colorant layer of the second embodiment. Concretely, as far as the sublimable dye is dissolvable to a solvent contained in the coating liquid for colorant layer of the second embodiment, any sublimable dye is usable.

There is also no particular limitation on the "colorant dispersible in the predetermined solvent" which is contained in the coating liquid for colorant layer of the second embodiment, and it can be appropriately selected depending on the kind of the above mentioned predetermined solvent contained in the coating liquid for colorant layer of the second embodiment. Concretely, as far as the colorant is dispersible to a solvent contained in the coating liquid for colorant layer of the second embodiment, any colorant is usable. Incidentally, the "colorant dispersible to the predetermined solvent" which is contained in the coating liquid for colorant layer of the second embodiment denotes a colorant which is impossible to be dissolved in the predetermined solvent, and there is no particular limitation on the dispersibility of the colorant. For instance, it is possible to improve the dispersibility of the colorant by using the dispersant. That is, as far as the colorant is dispersed in the coating liquid for colorant layer of the second embodiment as a result, there is no limitation.

The sublimable dye soluble in the predetermined solvent and the colorant dispersible in the predetermined solvent can be appropriately selected depending on the solvent contained in the coating liquid for colorant layer of the second embodiment. Concretely, at first a predetermined solvent is selected, and then, a sublimable dye soluble in the predetermined solvent and a colorant dispersible in the predetermined solvent may be selected.

As the sublimable dye and the colorant contained in the coating liquid for colorant layer of the second embodiment, the sublimable dyes and the colorants as described in the above explanation for the colorant layer of the thermal transfer sheet of the first embodiment can be used with an appropriate selection, and thus, a detailed description thereof will be omitted here.

Here, since the quinophthalone dyes represented by the above formula (1) possesses light resistance and a high brightness, they are preferable as the sublimable dye dissolvable to the predetermined solvent, or the sublimable dye dispersible to the predetermined solvent.

Further, since the pigments represented by the above formula (2) can show a high dispersibility in the coating liquid for colorant layer of the second embodiment, and can increase the stability of the coating liquid for colorant layer of the second embodiment, and further it can also prevent the occurrences of the kick and the scumming effectively, they are preferable as the colorant dispersible to the predetermined solvent.

The coating liquid for colorant layer of the second embodiment may contain, as the "sublimable dye dissolvable in the predetermined solvent", a kind of the sublimable dye singly, or two or more kind of the sublimable dyes in combination. Further, in the case that the "colorant dispersible to the predetermined solvent" is a sublimable dye, the coating liquid for colorant layer of the second embodiment may contain, as the "sublimable dye dispersible in the predetermined solvent", a kind of the sublimable dye singly, or two or more kind of the sublimable dyes in combination. It is also possible to contain, as the "colorant dispersible to the predetermined solvent", sublimable dye(s) and pigment(s) in combination. It is also possible to use two or more kinds of pigments in combination. With respect to the pigment, it is possible to use the pigments as described in the above explanation for the colorant layer of the thermal transfer sheet of the first embodiment with an appropriate selection, and thus, the detailed description thereof will be omitted here.

Hereinafter, examples of the colorant(s) and the sublimable dye(s) contained in the coating liquid for colorant layer of the second embodiment will be explained with referring to concrete solvents. The manufacturing method of the thermal transfer sheet of the second embodiment is not limited to these combinations.

In the case that the predetermined solvent is a mixed solvent of methyl ethyl ketone/toluene:

As the sublimable dye capable of dissolving in the mixed solvent of methyl ethyl ketone/toluene, for example, Disperse Yellow 201 or the like can be used. Further, as the colorant dispersible in the mixed solvent of methyl ethyl ketone/toluene, for instance, the pigments exemplified above, the sublimable dyes exemplified above, for example, Disperse Yellow 54 or the like can be used.

In the coating liquid for colorant layer, a dispersant for improving the dispersibility of the colorant may be contained. As the dispersant, for instance, graft-type polymer dispersion aids, polyether-based dispersant aids, acryl based block type polymer dispersant aids and the like may be enumerated. In addition, as the dispersant, derivatives in which organic pigment was treated with a sulfonated compound or the like may be enumerated. As the treating method, in addition to rosin treatment, surface treatments such as acidic group treatment, basic treatment, pigment derivative treatment, and the like may be enumerated.

Further, the coating liquid for colorant layer may contain other optional additives, for instance, a releasing agent for improving releasability from the receiving layer of the thermal transfer-image receiving sheet, an antistatic agent, an organic or inorganic filler for controlling the lubricity with the receiving layer, etc., in addition to the essential components, i.e., the binder resin, the predetermined solvent, the sublimable dye dissolvable in the predetermined solvent, and the colorant dispersible to the predetermined solvent.

In a preferred method for manufacturing a thermal transfer sheet of the second embodiment, the coating liquid for colorant layer of the second embodiment contains the "specific dispersant(s)" as described in the above explanation for the coating liquid for colorant layer of the first embodiment, in addition to the binder resin, the predetermined solvent, the colorant $10x$ dispersible to the predetermined solvent and the sublimable dye dissolvable in the predetermined solvent. According to this manufacturing method of the thermal transfer sheet of this preferred form, owing to the function of the "specific dispersants", it is possible to further repress the occurrences of the kick and the scumming, and further improve the density of the image formed, in the thermal transfer sheet manufactured by the manufacturing method of the second embodiment, and further, it is also possible to further improve the light resistance, and suppress the reduction of the print density in the highlight portion.

Although there is no particular limitation for the method of forming the colorant layer 3, and for instance, the colorant layer can be formed by preparing a coating liquid for colorant layer where a binder resin, a solvent, a sublimable dye dissolvable in the solvent, and a colorant dispersible to the solvent, and optionally any additive(s) such as a dispersant, a releasing agent or the like as necessary, are used, and the sublimable dye is dissolved in the solvent and the colorant is dispersed in the solvent, coating thus prepared coating liquid for colorant layer on the substrate sheet in accordance with a known coating procedure such as the gravure printing method, the screen printing method, the reverse roll coating printing method using a gravure plate, or the like, and then drying the coated solution. Although there is no particular limitation about the coating amount of the coating liquid for the colorant layer, it is preferable that it is in the range of 0.2 g/m$^2$-10 g/m$^2$ in terms of solid content.

As described above, the manufacturing method of the second embodiment is fairly explained as mainly describing about the manufacturing method for providing the colorant layer 3 directly on the substrate sheet 2. Similar to the method of manufacturing a thermal transfer sheet of the first embodiment, however, the manufacturing method of the second embodiment may include step(s) of providing arbitrary layer(s), between the substrate sheet 2 and the colorant layer 3, and/or on another surface side of the substrate sheet 2, on which the colorant layer 3 does not formed.

<Thermal Transfer Sheet of the Second Embodiment>

The thermal transfer sheet 1 of the second embodiment, as shown in FIG. 1, takes a configuration in which the colorant layer 3 is provided on the substrate sheet 2. Here, w the thermal transfer sheet 1 of the second embodiment is characterized in that, as shown in FIG. 4, the colorant layer 3 includes a predetermined solvent, a sublimable dye $10y$, and a colorant $10x$, and the sublimable dye $10y$ is a sublimable dye that is soluble in the predetermined solvent, and the colorant $10x$ is a colorant that is dispersible in the predetermined solvent.

According to the thermal transfer sheet of the second embodiment comprising the colorant layer 3 having the above characteristics, for the reasons as described in the above explanation for the manufacturing method of the second embodiment, it is possible to prevent the occurrences of the kick and/or the scumming, and to form a high density image.

Here, it should be noted that, although the thermal transfer sheet of the second embodiment also has an essential condition that the colorant layer 3 contains a predetermined solvent, the condition does not intend to denote that the predetermined solvent is positively and actively contained in the colorant layer 3. But, the predetermined solvent contained in the colorant layer 3 refers to a residual solvent contained in the colorant layer 3. Concretely, when the solvent remaining in the colorant layer 3 is a solvent which can dissolve the sublimable dye included in the colorant layer and which can disperse the colorant included in the colorant layer, it can be said that the thermal transfer sheet of the second embodiment can exhibit the same functions and effects as the thermal transfer sheet manufactured by the manufacturing method of the second embodiment.

"Determination Method for Colorant, Residual Solvent"

For instance, by the following method, it is possible to determine whether a thermal transfer sheet of interest (hereinafter, referred to as target thermal transfer sheet) satisfies the matters specifying the thermal transfer sheet of the second embodiment or not. First, the colorant layer of the target thermal transfer sheet is analyzed in order to identify the colorant component contained in the colorant layer. As the identification method of the colorant components, any conventionally known analytical method such as the nuclear magnetic resonance spectroscopy, IR spectroscopy or the like is applicable.

In the above analysis of the colorant layer, when it is determined that the colorant contained in the colorant layer is only one kind, the target thermal transfer sheet can be judged as not being satisfying the matters specifying the thermal transfer sheet of the second embodiment. On the other hand, when it is determined that the colorants contained in the colorant layer are two or more kinds, the kind of the solvent remaining in the colorant layer is further determined. As the identification method of the kind of the solvent, for example, the gas chromatography is applicable. In the identification of the kind of the solvent by the gas chromatography, for instance, a gas chromatography analyzer such as Gas Chromatography GC14-A, manufactured by Shimadzu Corporation, and the like can be utilized. Incidentally, in order to eliminate the influence of the solvents which have been contained in the substrate sheet, a heat resisting sliding layer, and/or any arbitrary layers in the target thermal transfer sheet, it is necessary to analyze to the layer corresponding to the colorant layer of the target thermal transfer sheet on the identification of the kind of the solvent. Concretely, when the kind of the solvent remaining in the colorant layer is determined by using the gas chromatography method, it is important to take only a part of the layer corresponding to the colorant layer of the target thermal transfer sheet and carry out the analyze to the portion.

When at least one of the identified colorant components as mentioned above is the colorant component dissolvable in the identified solvent as mentioned above, and at least one of the identified colorant components as mentioned above is the colorant component dispersible in the identified solvent as mentioned above, the target thermal transfer sheet can be judged as being satisfying the matters specifying the thermal transfer sheet of this embodiment. Incidentally, in the case that two or more kinds of solvents are identified in the colorant layer of the target thermal transfer sheet, when at least one of the identified colorant components is the colorant component dissolvable in at least one of the identified solvents, and at least one of the identified colorant components is the colorant component dissolvable to none of the identified solvents, the target thermal transfer sheet can be judged as being satisfying the matters specifying the thermal transfer sheet of this embodiment. Further, by using the "determination method for dispersibility of colorant to predetermined solvent" as described in the above explanation for the manufacturing method of the first embodiment, it is possible to determine whether the identified colorant can be dissolved or can be dispersed in the identified solvent.

Hereinafter, each component of the thermal transfer sheet of the second embodiment will be described. Incidentally, the thermal transfer sheet of the second embodiment is correlated with the manufacturing method of the second embodiment, and thus, unless otherwise specified, those described in the manufacturing method of the second embodiment can be used as-is.

There is no particular limitation on the substrate sheet 2, and it is possible to use any of the substrate sheets described in the manufacturing method of the second embodiment by selecting appropriately.

(Colorant Layer)

In the colorant layer 3, a binder resin, a sublimable dye, a colorant and a predetermined solvent are included. With respect to each individual component, it is possible to use any of the corresponding components described in the manufacturing method of the second embodiment by selecting appropriately. Herein, the sublimable dye referred to in the thermal transfer sheet of the second embodiment means a sublimable dye dissolvable in a predetermined solvent, and the colorant means a colorant dispersible in the predetermined solvent.

With respect to the containing ratio of the sublimable dye and the colorant in the colorant layer, there is no particular limitation, and the ratio can be determined appropriately depending on the function(s) required to the colorant layer, for instance, light resistance, density characteristics, etc.

In a preferred form, the colorant layer 3 further contains the "specific dispersant(s)" as described in the above explanation for the first embodiment. According to this colorant layer 3, it is possible to repress the occurrences of the kick and the scumming, and further improve the density of the image formed, and further, it is also possible to further improve the light resistance, and suppress the reduction of the print density in the highlight portion, owing to the function of the "specific dispersant(s)".

The colorant layer 3 may also contain optional components such as a releasing agent. For example, by containing a releasing agent in the colorant layer 3, it is possible to improve the releasing property between the colorant layer 3 and the receiving layer at the time of image formation. In the case that measures for releasing property is taken in the receiving layer side, it is not always necessary to include the releasing agent in the colorant layer 3.

As the releasing agent, it is possible to use the releasing agents as described in the above explanation for the manufacturing method of the first embodiment with an appropriate selection, and thus, the detailed description thereof will be omitted here.

Further, a primer layer may be provided between the substrate sheet 2 and the colorant layer 3. As the primer layer, the primer layer as described in the above explanation for the thermal transfer sheet of the first embodiment can be used as-is, and thus, the detailed description thereof will be omitted here.

(Back Face Layer)

Further, a back face layer may be provided on the other surface of the substrate sheet 2. As the back face layer, the back face layer as described in the above explanation for the thermal transfer sheet of the first embodiment can be used as-is, and thus, the detailed description thereof will be omitted here.

(Back Face Primer Layer)

Further, a back face primer layer may be provided between the substrate sheet 2 and the back face layer 5. As the back face primer layer, the back face primer layer as described in the above explanation for the thermal transfer sheet of the first embodiment can be used as-is, and thus, the detailed description thereof will be omitted here.

<Method of Manufacturing a Thermal Transfer Sheet of Third Embodiment>

Figure 5:
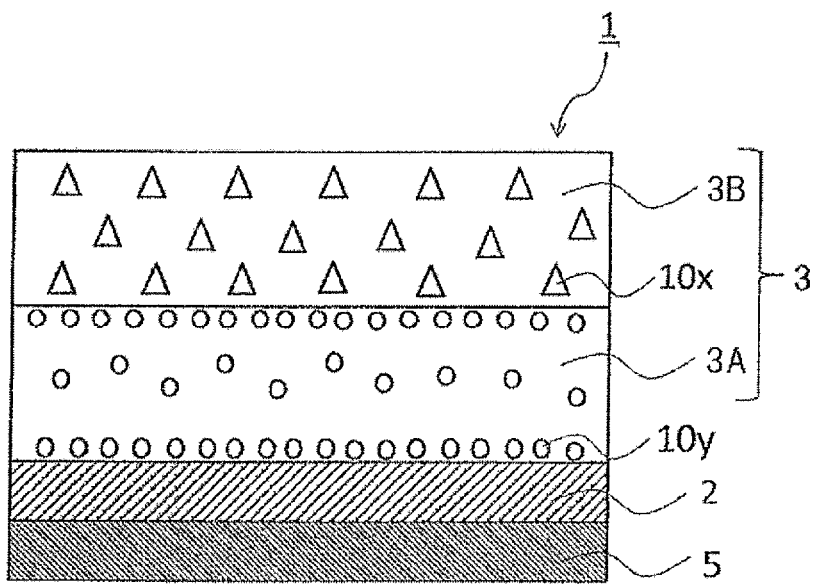
FIG. 5 is a schematic sectional view showing an example of a thermal transfer sheet of the third embodiment.

Next, a thermal transfer sheet which is manufactured by a method for manufacturing a thermal transfer sheet of the third embodiment will be explained with reference to FIG. 5. FIG. 5 is a schematic cross-sectional view of the thermal transfer sheet which is manufactured by the method for manufacturing a thermal transfer sheet of the third embodiment.

The method for manufacturing a thermal transfer sheet of the third embodiment is characterized by comprising a first colorant layer forming step where a coating liquid which contains a first solvent and a sublimable dye soluble in the first solvent is applied onto a surface of a substrate sheet to form the first colorant layer; and a second colorant layer forming step where a coating liquid which contains a second solvent and a colorant dispersible in the second solvent is applied onto the first colorant layer to form the second colorant layer.

In the third embodiment, on the substrate sheet, the first colorant layer 3A is formed by coating a coating liquid which contains a first solvent and a sublimable dye soluble in the first solvent. As explained above, in the colorant layer formed by using the coating liquid wherein the sublimable dye is dissolved, the sublimable dye is present in a state of being localized to the interfaces (See, FIG. 3), and is in a state of causing the kick and/or the scumming with ease. In other words, in the case that a thermal transfer sheet where only the first colorant layer 3A is provided on the substrate sheet 2 is manufactured, it is impossible to prevent the kick and/or the scumming, although it becomes possible to form a high density image by using the thermal transfer sheet.

Therefore, in the third embodiment, the occurrences of the kick and/or the scumming for which the first colorant layer 3A cannot compensate is prevented by forming another layer on the first colorant layer 3A. Concretely, in the third embodiment, a second colorant layer is formed on the first colorant layer by coating a coating liquid which contains a second solvent and a colorant dispersible in the second solvent onto the first colorant layer 3A. Since the second colorant layer 3B provided in the third embodiment is formed by using the coating liquid where the colorant is dispersed, the colorant $10x$ in the second colorant layer 3B thus formed (See FIG. 2) are uniformly dispersed, and it is possible to prevent the occurrences of the kick and the scumming owing to the presence of the second colorant layer 3B. That is, the second colorant layer 3B is mainly serves just as a lid for closing the sublimable dye $10y$ localized at the interfaces of the first colorant layer 3A.

Moreover, since the first colorant layer 3A is formed between the substrate sheet 2 and the second colorant layer 3B, by using the coating liquid where the sublimable dye has been dissolved, the sublimable dye can be present at its molecular in the first colorant layer 3A. Thus, it is possible to enhance the thermal migration of the sublimable dye contained in the first colorant layer 3A, and also possible to foam a high density image. Furthermore, since the second colorant layer 3B contains the colorant $10x$, owing to the synergistic effect of the sublimable dye $10y$ with the colorant $10x$, it becomes possible to form a higher density image.

Next, the coating liquid for forming the first colorant layer 3A, and the coating liquid for forming the second colorant layer 3B will be described. Hereinafter, the coating liquid for forming the first colorant layer 3A is referred to as "first coating liquid" and the coating liquid for forming the second colorant layer 3B is referred to as "second coating liquid" for these explanations.

(First Coating Liquid)

In the first coating liquid, a first binder resin, a first solvent, and a sublimable dye dissolvable to the first solvent are included. That is, the sublimable dye is present in a state of being dissolved in the first coating liquid.

There is no particular limitation for the first binder resin contained in the first coating liquid, and it can be appropriately selected depending on the kind of the sublimable dye dissolvable in a first solvent. For example, the binder resins contained in the coating liquid for the colorant layer as described in the manufacturing method of the first embodiment may be mentioned. Ditto for the second binder resin which is contained in the second coating liquid described below. Also, the first binder resin may be the same with or may be different from the second binder resin.

"Sublimable Dye"

There is no particular limitation on the sublimable dye which is dissolved in the first coating liquid, and it can be appropriately selected depending on the kind of the first solvent to be contained in the first coating liquid. For example, the sublimable dyes as described in the above explanation for the manufacturing method of the first embodiment may be mentioned. The first coating liquid may contain two or more kinds of the sublimable dyes.

"First Solvent"

As the first solvent, as long as it is capable of dissolving the sublimable dye, it is not particularly limited, and it may be appropriately selected from known solvents. The first coating liquid may contain two or more solvents, provided that at least one of the solvents is capable of dissolving at least one of the sublimable dyes contained in the first coating liquid.

In the first coating liquid, colorant(s) dispersible to the first solvent may be contained. That is, the first colorant layer 3A may have a same constitution as the colorant layer 3 (See FIG. 5) which is formed by the manufacturing method of the above mentioned second embodiment. Further, in the first coating liquid, any optional ingredient(s) may be contained, in addition to the first binder resin, the first solvent, and the sublimable dye.

Although there is no particular limitation on the method of forming the first colorant layer, and for instance, the first colorant layer can be formed by preparing a first coating liquid where a sublimable dye is dissolved in the solvent, coating thus prepared first coating liquid on the substrate sheet in accordance with a known coating procedure such as the gravure printing method, the screen printing method, the reverse roll coating printing method using a gravure plate, or the like, and then drying the coated solution. Although there is no particular limitation about the coating amount of the first coating liquid, it is preferable that it is in the range of 0.1 $g/m^2$-5 $g/m^2$ in terms of solid content.

(Second Coating Liquid)

In the second coating liquid, a second binder resin, a second solvent, and a colorant dispersible to the second solvent are included. That is, the colorant is present in a state of being dispersed in the second coating liquid.

"Colorant"

There is no particular limitation on the colorant which is dispersed in the second coating liquid, and it can be appropriately selected depending on the kind of the second solvent to be contained in the second coating liquid. The colorant may be sublimable dye(s), or may be pigments, and it is possible to use any of the colorants as described in the above explanation for the manufacturing method of the first embodiment. The second coating liquid may contain two or more kinds of colorants.

"Second Solvent"

As the second solvent, as long as it is capable of dispersing the colorant as mentioned above, it is not particularly limited, and it may be appropriately selected from known solvents. The first coating liquid may contain two or more solvents, provided that at least one of the colorants contained in the second coating liquid can be dissolved in none of the solvents contained in the first coating liquid.

In the second coating liquid, any optional ingredient (s) may be contained, in addition to the second binder resin, the second solvent, and the dispersible colorant. For example, the second coating liquid may contain a dispersant for improving the dispersibility of the colorant. As the dispersant, for example, it is possible to use the dispersants as described in the thermal transfer sheet of the first embodiment.

Further, in the second coating liquid, a sublimable dye dissolvable in the second solvent to be contained in the second coating liquid may contained. That is, the second colorant layer 3B may have a same constitution as the colorant layer 3 (See FIG. 4) which is formed by the manufacturing method of the above mentioned second embodiment. According to this constitution, since the sublimable dye(s) is dissolved in both of the first coating liquid and the second coating liquid, it can be expected to form a higher density image, by means of the synergistic effect of the first colorant layer 3A and the second colorant layer 3B.

In the case that the second colorant layer 3B which is formed using the second coating liquid is located at the outermost surface of the thermal transfer sheet, it is preferable that a releasing agent is contained in the second coating liquid. As the releasing agent, the releasing agents as described in the explanation of the colorant layer of the thermal transfer sheet of the first embodiment may be used. Incidentally, in the case that measures for improving the releasing property is taken in the transfer receiving article side, for instance, the receiving layer side of the thermal transfer image-receiving sheet, it is not always necessary to include the releasing agent in the second coating liquid.

As described above, the first solvent and the sublimable dye dissolvable to the first solvent which are contained in the first coating liquid, as well as the second solvent and the colorant dispersible to the second solvent which are contained in the second solvent, in accordance with the method of manufacturing the thermal transfer sheet of the third embodiment are fairly explained. The first solvent and the second solvent may be different from each other, and the sublimable dye contained in the first coating liquid and the colorant contained in the second coating liquid may be also different from each other. Alternatively, the first solvent and the second solvent may be the same with each other, and the sublimable dye contained in the first coating liquid and the colorant contained in the second coating liquid may be also different from each other. In this case, at least one kind of the sublimable dyes included in the first coating liquid should be dissolved in the common solvent, and at least one kind of the colorants included in the second coating liquid should be dispersed in the common solvent In further another instance, the first solvent and the second solvent may be different from each other, and the sublimable dye contained in the first coating liquid and the colorant contained in the second coating liquid may be the same with each other. In this case, the first solvent contained in the first coating liquid should be able to dissolve the common colorant, and the second solvent contained in the second coating liquid and being different from the first solvent should be able to disperse the common colorant.

In a preferred method for manufacturing a thermal transfer sheet of the third embodiment, the second coating liquid further contains the "specific dispersant(s)" as described in the above explanation for the coating liquid for colorant layer of the first embodiment, in addition to the binder resin, the predetermined solvent, and the colorant $10x$ dispersible to the predetermined solvent. According to the manufacturing method of the thermal transfer sheet of this preferred form, it is possible to repress the occurrences of the kick and the scumming in the thermal transfer sheet obtained by the manufacturing method of the third embodiment, and further improve the density of the image formed, and further, it is also possible to further improve the light resistance, and suppress the reduction of the print density in the highlight portion, owing to the function of the "specific dispersant(s)".

Although there is no particular limitation on the method of forming the second colorant layer, and for instance, the second colorant layer can be formed by preparing a second coating liquid where a colorant is dispersed in the solvent, coating thus prepared second coating liquid on the first colorant layer in accordance with a known coating procedure such as the gravure printing method, the screen printing method, the reverse roll coating printing method using a gravure plate, or the like, and then drying the coated solution. Although there is no particular limitation about the coating amount of the second coating liquid, it is preferable that it is in the range of 0.1 $g/m^2$-5 $g/m^2$ in terms of solid content.

As described above, the manufacturing method of the third embodiment is fairly explained as mainly describing about the manufacturing method for providing the second colorant layer 3B directly on the first colorant layer 3A. However, the manufacturing method of the third embodiment may include step(s) of providing arbitrary layer(s) between the first colorant layer 3A and the second colorant layer 3B. Further, the manufacturing method of the third embodiment may include step(s) of providing arbitrary layer(s) between the substrate sheet 2 and the first colorant layer 3A. In addition, it may include step(s) of providing arbitrary layer(s) on another surface side of the substrate sheet 2, on which the first colorant layer 3A does not formed.

<Thermal Transfer Sheet of Third Embodiment>

The thermal transfer sheet 1 of the third embodiment is characterized in that it comprises a substrate 2 and a colorant layer 3 provided on one surface of the substrate sheet 3, as shown in FIG. 5; wherein the colorant layer 3 comprises a layered structure in which a first colorant layer 3A and a second colorant layer 3B are layered in this order; wherein the first colorant layer 3A contains a first solvent and a sublimable dye soluble in the first solvent; and wherein the second colorant layer contains a second solvent and a colorant dispersible in the second solvent.

According to the thermal transfer sheet of the third embodiment having the colorant layer 3 of the above features, since the second colorant layer 3B is serves just as a lid for closing the sublimable dye 10y localized at the interfaces of the first colorant layer 3A, and by the same reasons with those explained in the method for manufacturing the thermal transfer sheet of the third embodiment, it is possible to prevent the occurrences of the kick and the scumming, and to form a high density image.

Here, it should be noted that, although the thermal transfer sheet of the third embodiment also has an essential condition that the first colorant layer 3A contains a first solvent and the second colorant layer 3B contains a second solvent, as is the case with the thermal transfer sheet of the first embodiment or the second embodiment, the conditions does not intend to denote that the first and second solvents are positively and actively contained in the first colorant layer 3A and the second colorant layer, respectively. But, the first solvent contained in the first colorant layer 3A refers to residual solvent contained in the first colorant layer 3A, and the second solvent contained in the second colorant layer 3B refers to residual solvent contained in the second colorant layer 3B. Concretely, when the solvent remaining in the first colorant layer 3A is a first solvent which can dissolve the sublimable dye included in the first colorant layer and the solvent remaining in the second colorant layer 3B is a second solvent which can disperse the colorant included in the second colorant layer, it can be said that the thermal transfer sheet of the third embodiment can exhibit the same functions and effects as the thermal transfer sheet manufactured by the manufacturing method of the third embodiment.

As long as the dissolving and dispersing conditions for the sublimable dye in the first colorant layer 3A and the colorant in the second colorant layer 3B can satisfy the above mentioned relation, as described in the manufacturing method of the third embodiment, the first solvent remained in the first colorant layer and the second solvent remained in the second colorant layer may be the same with each other. In this case, the first colorant layer 3A should contain at least one kind of the sublimable dye which is soluble in the common solvent, and also, the second colorant layer should contain at least one kind of the colorant which is dispersible in the common solvent. Alternatively, the sublimable dye contained in the first colorant layer 3A and the colorant contained in the second colorant layer may be the same with each other In this case, a first solvent capable of dissolving the common colorant should be remained in the first colorant layer 3A, and a second solvent capable of dispersing the common colorant should be remained in the second colorant layer 3B.

It is possible to determine whether a thermal transfer sheet of interest satisfies the matters specifying the thermal transfer sheet of the third embodiment or not, by investigating the relations of the solvents and the colorants contained in the individual layers. Concretely, when the colorant layer in the target thermal transfer sheet does not have a layered structure, the target thermal transfer sheet can be judged as not being satisfying the matters specifying the thermal transfer sheet of the third embodiment. On the other hand, when the colorant layer of the target thermal transfer sheet can be determined as to have a layered structure, solvent(s) and colorant(s) contained in the colorant layer closer to the substrate sheet are identified. On this identification, when the colorant component is the one which can be dissolved in the identified solvent, the colorant layer can be judged as being satisfying the construction of the first colorant layer. Then, solvent(s) and colorant(s) contained in the colorant layer farther from the substrate sheet are identified. On this identification, when the colorant component is the one which can be dispersed in the identified solvent, the colorant layer can be judged as being satisfying the construction of the second colorant layer. Further, when a layer of the same construction as the first colorant layer and a layer of the same construction as the second colorant layer are layered, the target heat transfer sheet can be judged as being satisfying the matters specifying the thermal transfer sheet of the third embodiment. As the determination method for colorant and solvent, the methods as described in the explanation for the first embodiment can be used as-is. Further, by using the "determination method for dispersibility of colorant to predetermined solvent" as described in the above explanation for the manufacturing method of the first embodiment, it is possible to determine whether the identified colorant can be dissolved or can be dispersed in the identified solvent.

Next, each component of the thermal transfer sheet of the third embodiment will be described. Incidentally, the thermal transfer sheet of the third embodiment is correlated with the manufacturing method of the third embodiment, and thus, unless otherwise specified, those described in the manufacturing method of the third embodiment can be used as-is.

There is no particular limitation on the substrate sheet 2, and it is possible to use any of the substrate sheets described in the manufacturing method of the first embodiment by selecting appropriately.

(First Colorant Layer)

In the first colorant layer 3A, a first binder resin, a first solvent, and a sublimable dye dissolvable to the first solvent are included. With respect to each individual component, it is possible to use any of the corresponding components described in the above explanation for the first coating liquid of the manufacturing method of the third embodiment by selecting appropriately.

The first colorant layer may contain a colorant dispersible in the first solvent. The first colorant layer 3A may any optional component(s) which are described in the above explanation for the first coating liquid of the manufacturing method of the third embodiment, in addition to the first binder resin, the first solvent, the sublimable dye dissolvable to the first solvent.

With respect to the method for forming the first colorant layer 3A, it is possible to use the method as described in the manufacturing method of the third embodiment. Ditto for the second coloring layer 3B.

(Second Colorant Layer)

In the second colorant layer 3B, a second binder resin, a second solvent, and a colorant dispersible to the second solvent are included. With respect to each individual component, it is possible to use any of the corresponding components described in the above explanation for the second coating liquid of the manufacturing method of the third embodiment by selecting appropriately.

The second colorant layer 3B may contain a colorant dissolvable in the second solvent. The second colorant layer 3B may any optional component(s) which are described in the above explanation for the second coating liquid of the manufacturing method of the third embodiment, in addition to the second binder resin, the second solvent, the colorant dispersible to the first solvent.

The second colorant layer of a preferred mode may further contain the "specific dispersant(s)" as described in the above explanation for the coating liquid for colorant layer of the first embodiment. According to the thermal transfer sheet which having this second colorant layer 3B, it is possible to repress the occurrences of the kick and the scumming in the thermal transfer sheet, and further improve the density of the image formed, and further, it is also possible to further improve the light resistance, and suppress the reduction of the print density in the highlight portion, owing to the function of the "specific dispersant(s)".

The thermal transfer sheet of the third embodiment, as is the same with the thermal transfer sheet of the first embodiment, may have a primer layer between the substrate sheet 2 and the first colorant layer 3A, and may have a back face layer on another surface of the substrate sheet 2. Further, a back face primer layer may be provided between the substrate sheet 2 and the back face layer.

«Image Forming Method»

Next, the image forming method of an embodiment of the present invention will be described.

The image forming method of the first embodiment is characterized in that it is for forming image on a thermal transfer image-receiving sheet by using a thermal transfer sheet having a colorant layer on a surface of a substrate sheet in combination with the thermal transfer image-receiving sheet having a receiving layer on a surface of another substrate sheet; wherein the colorant layer of the thermal transfer sheet contains a predetermined solvent, a colorant dispersible in the predetermined solvent, a dispersant and a binder resin; and wherein the dispersant is one or more kinds of dispersants selected from the group consisting of polyether-based dispersants, graft type polymer dispersants, acryl-based block type polymer dispersants, urethane-based polymer dispersants and azo-based dispersants. That is, it is characterized by using the thermal transfer sheet of the first embodiment as the thermal transfer sheet.

The image forming method of the second embodiment is characterized by using the thermal transfer sheet of the second embodiment as the thermal transfer sheet. The image forming method of the third embodiment is characterized by using the thermal transfer sheet of the third embodiment as the thermal transfer sheet.

According to the image forming methods of the first embodiment, the second embodiment, and the third embodiment, of the present invention, it is possible to form a photographic tone color image of high quality with a continuous tone image by sublimation transfer.

(Thermal Transfer Image-Receiving Sheet)

The thermal transfer image-receiving sheet to be used in combination with the above thermal transfer sheet has another substrate sheet and a receiving layer provided on the another substrate sheet as essential components. As the another substrate sheet used herein, it is possible to use the same type with the substrate sheet of the above mentioned thermal transfer sheet. Alternatively, it is also possible to use a different type from the substrate sheet of the above mentioned thermal transfer sheet. The thermal transfer image-receiving sheet may be any one provided with this constitution, without any limitation. It can be selected from any conventionally known thermal transfer image-receiving sheets as appropriate to be used it.

(Image Formation)

With respect to the image forming method of the present invention, as long as the condition that the thermal transfer sheet to be used for the image formation is one of the thermal transfer sheet of the first embodiment, the thermal transfer sheet of the second embodiment and the thermal transfer sheet of the third embodiment as described above is satisfied, there are no particular restrictions for other requirements. For example, The image can be formed by superposing the colorant layer of the thermal transfer sheet to the receiving layer of the thermal transfer image-receiving sheet, then applying heat from the back side of the thermal transfer sheet with by a heating means such as a thermal head in order to transfer the colorant contained in the colorant layer to the receiving layer side.

EXAMPLE

Next, the present invention will be described with referring to Examples. Hereinafter, the expressions of "part(s)" and "%" are based on "weight", unless otherwise especially mentioned.

Example 1

In accordance with the procedure described below, a coating liquid for colorant layer and a thermal transfer sheet were prepared.

(Preparation of Coating Liquid for Colorant Layer 1)

As the following composition, a coating liquid for colorant layer 1 was prepared by adding a colorant, a dispersant, a binder resin, a solvent and 250 parts by weight of zirconia beads having a particle diameter of 2.0 mm into a glass bottle, sealing the glass bottle, shaking the content with a paint shaker (manufactured by Asada Iron Works Co., Ltd.) for 1 hour as a preliminary crushing, then removing the above mentioned zirconia beads from the bottle and adding 250 parts by weight of zirconia beads having a particle diameter of 0.1 mm to the bottle, and dispersing the content with the paint shaker similarly for 24 hour as a main crushing, in order to prepare a coating liquid for colorant layer 1. Preparation of the following coating liquids for colorant layer 2-7 and 10 were carried out in the same manner an mentioned above.

The point whether the following each individual colorant to be contained in the coating liquid for colorant layer can be solved in a mixed solvent of toluene and methyl ethyl ketone or can be dispersed in this mixed solvent was determined in advance by the following method. Namely, the method was performed by using toluene/methyl ethyl ketone=1/1 mixed solvent, adding the colorant into the mixed solvent so as to obtain a colorant concentration of 2 w/v %, then, stirring for one hour with heating to 50° C. Then, the resultant solution was allowed to left standing for 60 hours at 25° C., and after the standing, it was observed visually whether the precipitation or deposition of the colorant is caused or not. As a result of this observation, if no precipitation or deposition of the colorant was observed, the colorant was determined as the soluble colorant, whereas if precipitation or deposition of the colorant was observed, the colorant was determined as the dispersible colorant.

According to the above determination method, the "C. I. Disperse Yellow 54" which was to be included in the coating liquids for the colorant layers was determined to be a dispersible colorant in the toluene/methyl ethyl ketone mixed solvent. The "sulfonated derivative of C. I. Pigment Yellow 138" represented by the above Formula 3, was determined to be a dispersible colorant (pigment) in the toluene/methyl ethyl ketone mixed solvent, in addition to having the function as a dispersant for improving the dispersibility of the "C. I. Disperse Yellow 54". Further, the "C. I. Disperse Yellow 201", and the colorants represented by the following formulae 4 and 5 were determined to be soluble colorants.

<Coating Liquid for Colorant Layer 1>

| | |
|---|---|
| C.I. Disperse Yellow 54 (it is referred to as "dye A") | 4.75 parts |
| Dispersant of poly allyl amine-based graft type polymer (Ajisper PB881, Mw: 40000-50000, manufactured by Ajinomoto Fine-Techno Co., Ltd.) | 1.75 parts |
| Polyvinyl acetal resin (KS-5, manufactured by Sekisui Chemical Co., Ltd.) | 2.05 parts |
| Methyl ethyl ketone | 32.25 parts |
| Toluene | 32.25 parts |

The chemical formula of dye A is shown below.

[Chem. 6]

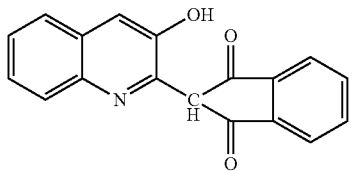

Dye A (Preparation of Thermal Transfer Sheet)

As a substrate, polyethylene terephthalate (PET) film which had 4.5 μm in thickness was used. On this substrate, a coating liquid for primer layer having the following composition was coated so as to obtain a coating amount of solid content of 0.05 g/m² in accordance with the wire bar coating method, and then the coated liquid was dried to form a primer layer.

<Coating Liquid for Primer Layer>

| | |
|---|---|
| Alumina sol (average primary particle diameter: 10 × 100 nm (solid content: 10%) (Alumina sol 200, manufactured by Nissan Chemical Industries Co., Ltd.) | 30 parts |
| Polyvinyl pyrrolidone resin (K-90, manufactured by ISP) | 3 parts |
| Water | 50 parts |
| Isopropyl alcohol | 17 parts |

Subsequently, the above mentioned coating liquid for colorant layer 1 was coated on the primer layer so as to obtain a coating amount of solid content of 0.8 g/m² in accordance with the wire bar coating method, and then the coated liquid was dried at 80° C. for 2 minutes to form the colorant layer. Thus, the thermal transfer sheet was prepared. Incidentally, on another surface of this substrate, a coating liquid for back face layer 1 having the following composition was coated so as to obtain a coating amount of solid content of 1.0 g/m² and then the coated liquid was dried to form a back face layer in advance.

<Coating Liquid for Back Face Layer 1>

| | |
|---|---|
| Polyvinyl acetal resin (S-LEC BX-1, manufactured by Sekisui Chemical Co., Ltd.) | 4.55 parts |
| Polyisocyanate (BURNOCK D750-45, solid content: 45% by weight, manufactured by DIC Corporation) | 21.0 parts |
| Phosphate-based surfactant (PLYSURF A-208N, manufactured by Dai-ichi Kogyo Seiyaku Co., Ltd.) | 3.0 parts |
| Talc (MICRO ACE P-3, manufactured by Nippon Talc Co., Ltd.) | 0.7 part |
| methyl ethyl ketone | 100.0 parts |
| toluene | 100.0 parts |

Example 2

A thermal transfer sheet of Example 2 was obtained by carrying out the same procedure as in Example 1 except that a coating liquid for colorant layer 2 wherein 1.7 parts of a polyether type dispersant (Solsperse 20000, weight average molecular weight: 1900, manufactured by The Lubrizol Corporation) was used instead of 1.7 parts of the poly allyl amine-based graft polymer dispersant in the composition of the coating liquid for colorant layer 1 was used in place of the coating liquid for colorant layer 1.

Example 3

A thermal transfer sheet of Example 3 was obtained by carrying out the same procedure as in Example 1 except that a coating liquid for colorant layer 3 wherein 2.83 parts (solid content: 1.7 parts) of an acryl-based block type polymer dispersant (BYK-LPN6919, weight average molecular weight: 9000, solid content: 60%, manufactured by BYK Additives & Instruments) was used instead of 1.7 parts of the poly allyl amine-based graft polymer dispersant in the composition of the coating liquid for colorant layer 1 was used in place of the coating liquid for colorant layer 1.

Example 4

A thermal transfer sheet of Example 4 was obtained by carrying out the same procedure as in Example 1 except that a coating liquid for colorant layer 4 having the following composition was used in place of the coating liquid for colorant layer 1.

<Coating Liquid for Colorant Layer 4>

| | |
|---|---|
| C.I. Disperse Yellow 54 (it is referred to as "dye A") | 4.75 parts |
| Dispersant of acryl-based block type polymer (solid content 1.0 part) (BYK-LPN6919, weight average molecular weight: 9000, solid content: 60%, manufactured by BYK Additives & Instruments) | 1.67 parts |
| Polyether-based dispersant (Solsperse 20000, weight average molecular weight: 1900, manufactured by The Lubrizol Corporation) | 0.7 part |
| Polyvinyl acetal resin (KS-5, manufactured by Sekisui Chemical Co., Ltd.) | 2.05 parts |
| Methyl ethyl ketone | 32.25 parts |
| Toluene | 32.25 parts |

The chemical formula of the dye A is that as mentioned above.

Example 5

A thermal transfer sheet of Example 5 was obtained by carrying out the same procedure as in Example 1 except that a coating liquid for colorant layer 5 having the following composition was used in place of the coating liquid for colorant layer 1.
<Coating Liquid for Colorant Layer 5>

| | |
|---|---|
| C.I. Disperse Yellow 54 (it is referred to as "dye A") | 4.275 parts |
| Pigment represented by the above Formula 3 (sulfonated derivative of C.I. Pigment Yellow 138) | 0.475 parts |
| Dispersant of acryl-based block type polymer (solid content 1.7 parts) (BYK-LPN6919, weight average molecular weight: 9000, solid content: 60%, manufactured by BYK Additives & Instruments) | 2.83 parts |
| Polyvinyl acetal resin (KS-5, manufactured by Sekisui Chemical Co., Ltd.) | 2.05 parts |
| Methyl ethyl ketone | 32.25 parts |
| Toluene | 32.25 parts |

The chemical formula of the dye A is that as mentioned above.

Example 6

A thermal transfer sheet of Example 6 was obtained by carrying out the same procedure as in Example 1 except that a coating liquid for colorant layer 5 having the following composition was used in place of the coating liquid for colorant layer 1.
<Coating Liquid for Colorant Layer 6>

| | |
|---|---|
| C.I. Disperse Yellow 54 (it is referred to as "dye A") | 9.00 parts |
| Pigment represented by the above Formula 3 (sulfonated derivative of C.I. Pigment Yellow 138) | 0.90 parts |
| Dispersant of acryl-based block type polymer (solid content 2.45 parts) (BYK-LPN6919, weight average molecular weight: 9000, solid content: 60%, manufactured by BYK Additives & Instruments) | 4.08 parts |
| Polyvinyl acetal resin (KS-5, manufactured by Sekisui Chemical Co., Ltd.) | 3.50 parts |
| Methyl ethyl ketone | 42.00 parts |
| Toluene | 42.00 parts |

The chemical formula of the dye A is that as mentioned above.

Example 7

A thermal transfer sheet of Example 7 was obtained by carrying out the same procedure as in Example 1 except that a coating liquid for colorant layer 7 wherein 4.25 parts (solid content: 1.7 parts) of an acryl-based block type polymer dispersant (BYK-LPN21116, weight average molecular weight: 8000, solid content: 40%, manufactured by BYK Additives & Instruments) was used instead of 2.83 parts (solid content: 1.7 parts) of an acryl-based block type polymer dispersant (BYK-LPN6919, weight average molecular weight: 9000, solid content: 60%, manufactured by BYK Additives & Instruments) in the composition of the coating liquid for colorant layer 5 was used in place of the coating liquid for colorant layer 1.

Example 8

A thermal transfer sheet of Example 8 was obtained by carrying out the same procedure as in Example 1 except that a coating liquid for colorant layer 8 having the following composition was used in place of the coating liquid for colorant layer 1.
(Preparation of Coating Liquid for Colorant Layer 8)

As the following composition, a dispersion was prepared by adding a colorant, a dispersant, a binder resin, a solvent and 250 parts by weight of zirconia beads having a particle diameter of 2.0 mm into a glass bottle, sealing the glass bottle, shaking the content with a paint shaker (manufactured by Asada Iron Works Co., Ltd.) for 1 hour as a preliminary crushing, then removing the above mentioned zirconia beads from the bottle and adding 250 parts by weight of zirconia beads having a particle diameter of 0.1 mm to the bottle, and dispersing the content with the paint shaker similarly for 3 hour as a main crushing, in order to prepare the dispersion. Then, 50 parts of a binder solution having the following composition was added to 50 parts of thus prepared dispersion, in order to prepare a coating liquid for colorant layer 8.
<Dispersion>

| | |
|---|---|
| C.I. Disperse Yellow 54 ("dye A") | 9.9 parts |
| Azo-based dispersant (Solsperse 22000, manufactured by The Lubrizol Corporation) | 0.7 part |
| Dispersant of urethane-based polymer (solid content 4.0 parts) (BYK-161, solid content: 30%, manufactured by BYK Additives & Instruments) | 13.33 parts |
| Methyl ethyl ketone | 32.25 parts |
| Toluene | 32.25 parts |

The chemical formula of the dye A is that as mentioned above.
<Binder Solution>

| | |
|---|---|
| Polyvinyl acetal resin (KS-5, manufactured by Sekisui Chemical Co., Ltd.) | 4.68 parts |
| Methyl ethyl ketone | 50 parts |
| Toluene | 50 parts |

Example 9

A thermal transfer sheet of Example 9 was obtained by carrying out the same procedure as in Example 1 except that a coating liquid for colorant layer 9 having the following composition was used in place of the coating liquid for colorant layer 1.
(Preparation of Coating Liquid for Colorant Layer 9)

The same procedure for the preparation of the coating liquid for colorant layer 10 was carried out except that 10.53 parts (solid content: 4.0 parts) of an urethane-based polymer dispersant (BYK-162, solid content: 38%, manufactured by BYK Additives & Instruments) was used instead of 13.33 parts (solid content: 4.0 parts) of the urethane-based polymer dispersant (BYK-161, solid content: 30%, manufactured by BYK Additives & Instruments) in the dispersion used for preparing the above mentioned coating liquid for colorant layer 8, in order to prepare a coating liquid for colorant layer 9.

Example 10

A thermal transfer sheet of Example 10 was obtained by carrying out the same procedure as in Example 1 except that a coating liquid for colorant layer 10 having the following composition was used in place of the coating liquid for colorant layer 1.

<Coating Liquid for Colorant Layer 10>

| | |
|---|---|
| C.I. Disperse Yellow 201 | 2.0 parts |
| C.I. Disperse Yellow 54 ("Dye A") | 4.0 parts |
| Quinophthalone-based dye represented by the following formula 4 | 2.0 parts |
| Pigment represented by the above Formula 3 (sulfonated derivative of C.I. Pigment Yellow 138) | 0.42 parts |
| Dispersant of acryl-based block type polymer (solid content 1.7 parts) (BYK-LPN21116, weight average molecular weight: 8000, solid content: 40%, manufactured by BYK Additives & Instruments) | 4.25 parts |
| Polyvinyl acetal resin (KS-5, manufactured by Sekisui Chemical Co., Ltd.) | 2.50 parts |
| Polyethylene wax (particle diameter: 5 µm) | 0.09 parts |
| Toluene | 33 parts |
| Methyl ethyl ketone | 33 parts |

The chemical formula of the dye A is that as mentioned above.

[Formula 7]

Formula 4

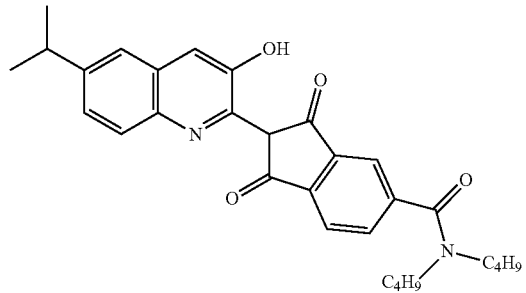

Comparative Example 1

As the following composition, a coating liquid for colorant layer A was prepared by adding a colorant, a dispersant, a binder resin, a solvent and 250 parts by weight of zirconia beads having a particle diameter of 2.0 mm into a glass bottle, sealing the glass bottle, shaking the content with a paint shaker (manufactured by Asada Iron Works Co., Ltd.) for 1 hour as a preliminary crushing, then removing the above mentioned zirconia beads from the bottle and adding 250 parts by weight of zirconia beads having a particle diameter of 0.1 mm to the bottle, and dispersing the content with the paint shaker similarly for 96 hour as a main crushing, in order to prepare a coating liquid for colorant layer A. The thermal transfer sheet of the Comparative example 1 was prepared by carrying out the same procedure as in Example 1 except that the coating liquid for colorant layer A prepared by the following procedure was used instead of the coating liquid for colorant layer 1.

<Coating Liquid for Colorant Layer A>

| | |
|---|---|
| C.I. Disperse Yellow 54 ("dye A") | 4.75 parts |
| Polyvinyl acetal resin (KS-5, manufactured by Sekisui Chemical Co., Ltd.) | 3.75 parts |
| Methyl ethyl ketone | 32.25 parts |
| Toluene | 32.25 parts |

The chemical formula of the dye A is that as mentioned above.

Comparative Example 2

A thermal transfer sheet of Comparative example 2 was obtained by carrying out the same procedure as in Example 1 except that a coating liquid for colorant layer B having the following composition was used in place of the coating liquid for colorant layer 1. Incidentally, the coating liquid for colorant layer B was the one which was prepared by dissolving a dye and a resin in a solvent. Ditto for a coating liquid for colorant layer C.

<Coating Liquid for Colorant Layer B>

| | |
|---|---|
| Quinophthalone-based dye represented by the following formula 4 | 4.75 parts |
| Polyvinyl acetal resin (KS-5, manufactured by Sekisui Chemical Co., Ltd.) | 3.75 parts |
| Methyl ethyl ketone | 32.25 parts |
| Toluene | 32.25 parts |

Comparative Example 3

A thermal transfer sheet of Comparative example 3 was obtained by carrying out the same procedure as in Example 1 except that a coating liquid for colorant layer C having the following composition was used in place of the coating liquid for colorant layer 1.

<Coating Liquid for Colorant Layer C>

| | |
|---|---|
| C.I. Disperse Yellow 54 ("dye A") | 4.75 parts |
| Polyvinyl acetal resin (KS-5, manufactured by Sekisui Chemical Co., Ltd.) | 3.75 parts |
| Polyethylene wax (particle diameter: 5 µm) | 0.99 parts |
| Methyl ethyl ketone | 33 parts |
| Toluene | 33 parts |

(Volume Average Particle Diameter of the Colorant)

With respect to the coating liquids for colorant layer 1-10, and A-C, which were prepared in the above Examples and Comparative examples for manufacturing thermal transfer sheet, the volume average particle diameter (nm) of colorant in each individual coating liquid which was dispersed in accordance with the above mentioned colorant dispersing condition was determined by using the particle size distribution measuring apparatus in accordance with the laser diffraction scattering method as mentioned above. The obtained results are shown in Table 1.

(State of Coating Liquid)

With respect to the coating liquids for colorant layer which were prepared in the above Examples and Comparative examples for manufacturing thermal transfer sheet, each coating liquid was observed visually, at the initial time after preparing the coating liquid in accordance with the above mentioned colorant dispersing condition, and after being left for 120 hours at room temperature from the initial time, about the presence or absence of precipitate in the coating liquid. The evaluation was done according to the following criteria.

1: There was no precipitate at all.
2: There was substantially no precipitate.
3: There was a little precipitate.
4; There was a lot of precipitate.
(Adhesiveness)

With respect to the thermal transfer sheets prepared as above, the adhesiveness of the colorant layer to the substrate sheet was examined by applying a cellophane tape to a surface of the colorant layer, rubbing the applied cellophane tape with a thumb by a to-and-fro motion so as to attach the cellophane tape to the colorant layer, and peeling the cellophane tape off from the colorant layer with an angle of 180° by hand just after the attaching. The evaluation was done by observing visually the state of transition of the colorant layer onto the peeled-off cellophane tape. Criteria for this evaluation are as follows.
1: The transition of the colorant layer onto the cellophane tape was not observed at all.
2: Although the transition of the colorant layer onto the cellophane tape was observed with a very little extent, but no problem arises in a practical use.
3: Although the transition of the colorant layer onto the cellophane tape was observed with a little extent, but no problem arises in a practical use.
4: The transition of the colorant layer onto the cellophane tape was observed with a certain extent.
(Printing Aptitude)

Using a test printer, and combining the each individual thermal transfer sheet as mentioned above with a thermal transfer receiving sheet prepared in accordance with the following condition, under the following printing condition 1, a yellow gradation pattern was printed in order to examine the density characteristics and the presence or absence of the abnormal transfer. The evaluation of the density characteristics was done at the highest concentration when applying a maximum energy and at a concentration of the highlight portion when applying a 60% energy. The measured concentrations are shown in Table 1. The evaluation of the abnormal transfer was done in accordance with the following criteria.
1: Abnormal transfer was not observed.
2: Although it was within a level of no problem in the practical use, a little stronger resisting level was observed on the peeling the thermal transfer sheet off from the thermal transfer receiving sheet after printing.
3: Abnormal transfer was observed.
(Printing Condition 1)

Thermal head: F3598 (manufactured by Toshiba Hokuto Electronics Co., Ltd.)

Average resistance value of heating element: 5176 (Ω)

Printing density along the main scanning direction: 300 dpi

Printing density along the sub scanning direction: 300 dpi

Printing Power: 0.12 (W/dot)

1-line period: 2 (msec.)

Pulse duty: 85% print-starting temperature: 35.5 (° C.)
(Preparation of Thermal Transfer Image-Receiving Sheet)

On a porous film layer made of a porous polyethylene film (Toyopearl-SS P4255, manufactured by Toyobo Co., Ltd., thickness: 35 μm), a coating liquid for forming intermediate layer having the following composition, and a coating liquid for forming receiving layer having the following composition, were coated and then dried in that order in accordance with the gravure reverse coating method, in order to form an intermediate layer and a receiving layer. On another side surface of the porous polyethylene film which was opposite to the surface onto which the intermediate layer and the receiving layer were formed, a coating liquid for forming adhesive layer having the following composition was coated and then dried in accordance with the gravure reverse roll coating method, in order to form an adhesive layer. Then, this adhesive layer side of the porous film was adhered to RC paper (155 g/m$^2$, 151 μm in thickness, manufactured by Mitsubishi Paper Mills) so as to form a thermal transfer image-receiving sheet. With respect to the coated amount of the above intermediate layer, receiving layer, and adhesive layer were 1.5 g/m$^2$, 5.0 g/m$^2$, and 5.0 g/m$^2$ in a dried state, respectively.

<Coating Liquid for Intermediate Layer>

| | |
|---|---|
| Polyester resin | 50 parts |
| (Polyester WR-905, manufactured by The Nippon Synthetic Chemical Industry Co., Ltd.) | |
| Titanium oxide | 20 parts |
| (TCA888, manufactured by Tochem Products) | |
| Fluorescent whitening agent | 1.2 parts |
| (Uvitex BAC, manufactured by Ciba Specialty Chemicals Inc.) | |
| Water/isopropyl alcohol = 1/1 | 28.8 parts |

<Coating Liquid for Receiving Layer>

| | |
|---|---|
| Vinyl chloride - vinyl acetate copolymer | 60 parts |
| (SOLBIN C, manufactured by Nissin Chemical Industry Co., Ltd.)) | |
| Epoxy - modified silicone | 1.2 parts |
| (X-22-3000T, manufactured by Shin-Etsu Chemical Co., Ltd.) | |
| Metylstyl - modified silicone | 0.6 parts |
| (X-24-510, manufactured by Shin-Etsu Chemical Co., Ltd.) | |
| Methyl ethyl ketone/toluene (mass ratio 1:1) | 5 parts |

<Coating Liquid for Adhesive Layer>

| | |
|---|---|
| Urethane resin | 30 parts |
| (TAKELAC A-969V, manufactured by Mitsui Takeda Chemical Inc.) | |
| Isocyanate | 10 parts |
| (TAKENATE, manufactured by Mitsui Takeda Chemical Inc.) | |
| Ethyl acetate | 100 parts |

(Evaluation of Light Resistance)

The colorant layer of each individual thermal transfer sheet was opposed to the receiving layer surface of the thermal transfer image-receiving sheet and superposed thereon, and then they were subjected to printing by using the test printer from the backside of the thermal transfer sheet under the above mentioned printing condition 1 so as to form a yellow printing pattern having 18 steps' gradation patterns of from 0/255 to 255/255 (Max concentration). Furthermore, by using the protective layer transfer sheet prepared in the following condition, and under the following printing conditions 2, the transferable protective layer was transferred onto the yellow printing pattern in order to obtain a final printed article.
(Preparation of Protective Layer Transfer Sheet)

As a substrate, polyethylene terephthalate (PET) film which had 4.5 μm in thickness was used. On a surface of this substrate, a coating liquid for peeling layer having the following composition was coated so as to obtain a coating amount of solid content of 1.0 g/m$^2$ in accordance with the wire bar coating method, and then the coated liquid was dried on an oven at 110° C. for 1 minute to form a peeling layer. Then, on the peeling layer, the above mentioned coating liquid for primer layer which was used in the above mentioned preparation of the thermal transfer sheet was coated so as to obtain a coating amount of solid content of 0.2 g/m² in accordance with the wire bar coating method, and then the coated liquid was dried on the oven at 110° C. for 1 minute to form a primer layer. Next, on the primer layer, a coating liquid for adhesive layer mentioned below was coated so as to obtain a coating amount of solid content of 1.0 g/m² in accordance with the wire bar coating method, and then the coated liquid was dried on the oven at 110° C. for 1 minute to form an adhesive layer. Incidentally, on another surface of this substrate, the coating liquid for back face layer 1 which had the above mentioned composition and which was used in the above mentioned preparation of the thermal transfer sheet was coated so as to obtain a coating amount of solid content of 1.0 g/m² and then the coated liquid was dried to form a back face layer in advance. Ultimately, a protective layer transfer sheet wherein the peeling layer, the primer layer and the adhesive layer which constituted the transferable protective layer were layered in this order on one surface of the substrate sheet, and the back face layer was provided on the another surface of the substrate was obtained.

<Coating Liquid for Peeling Layer>

| | |
|---|---|
| Polymethyl methacrylic acid (PMMA) (Dianal BR-87, manufactured by Mitsubishi Rayon Co., Ltd.) | 20 parts |
| Toluene | 40 parts |
| Methyl ethyl ketone | 40 parts |

<Coating Liquid for Adhesive Layer>

| | |
|---|---|
| Polyester resin (VYLON 220, manufactured by Toyobo Co., Ltd.) | 23.5 parts |
| UVA compound (Tinuvin 900, manufactured by Ciba Specialty Chemicals Co., Ltd.) | 6 parts |
| Silica filler (Sylysia 310P, manufactured by FUJI Silysia Chemical Ltd.) | 25 parts |
| Toluene | 35 parts |
| Methyl ethyl ketone | 35 parts |

(Printing Condition 2)

Thermal head: F3598 (manufactured by Toshiba Hokuto Electronics Co., Ltd.)

Average resistance value of heating element: 5176 (Ω)

Printing density along the main scanning direction: 300 dpi

Printing density along the sub scanning direction: 300 dpi

Printing Power: 0.096 (W/dot)

1-line period: 2 (msec.)

Pulse duty: 85% print-starting temperature: 35.5 (° C.)

The yellow printing pattern of the final printed article obtained by the above procedure underwent light irradiation under the following condition.

(Irradiation Conditions)

Irradiation tester: Ci35 manufactured by Atlas Corp.
Light source: xenon lamp
Filter: inside=IR filter, outside=soda lime glass
Black panel temperature: 45° C.
Irradiation intensity: 1.2 W/m², measured at 420 nm
Irradiation energy: 700 kJ/m², integrated value at 420 nm The color difference of images before and after the irradiation of the above irradiation condition was measured by a spectrophotometer (SpectroLino, manufactured by Gretag Macbeth Co., Ltd.). The measurement results are shown in Table 1. With respect to this measurement, the measurement was carried out for the places where the OD of Ye (yellow printed portion) before irradiation was at around 1.0.

Color difference $\Delta E^{*ab} = ((\Delta a^*)^2 + (\Delta b^*)^2)^{1/2}$

Please see, CIE 1976 La*b* color system (JIS Z8729 (1980))

$\Delta a^* = a^*(\text{after irradiation}) - a^*(\text{before irradiation})$ $\Delta b^* = b^*(\text{after irradiation}) - b^*(\text{before irradiation})$ Incidentally, a* and b* are based on the CIE 1976 L*A*b* color system, and the a* and b* represent perceptual brightness indexes.

(Contamination to the Back Face Layer)

The contamination to the back layer was evaluated in order to determine the storage stability of the thermal transfer sheet. The prepared dye face was opposed to the surface of the back face layer of the following substrate having the back face layer and superposed thereon, and then they were stored for 98 hours under loading of 40 kg/m² at 40° C., 90% RH, in order to evaluate the migration of colorant to the back face layer. For this evaluation of migration, the surfaces of the back face layers before and after the storage were measured by the spectrophotometer (SpectroLino, manufactured by Gretag Macbeth Co., Ltd.), and then, the color difference ($\Delta E^{*ab}$ was calculated in accordance with the following equation. The obtained results are shown in Table 1. Here, the above mentioned substrate having the back face layer was the one which was obtained by coating the coating liquid for back face layer 1 which had the above mentioned composition and which was used in the above mentioned preparation of the thermal transfer sheet, on a polyethylene terephthalate (PET) film which had 4.5 µm in thickness, so as to obtain a coating amount of solid content of 1.0 g/m² in accordance with the wire bar coating method, and then drying the coating liquid so as to form the back face layer.

Color difference $\Delta E^{*ab} = ((\Delta a^*)^2 + (\Delta b^*)^2)^{1/2}$

Please see, CIE 1976 La*b* color system (JIS Z8729 (1980))

$\Delta a^* = a^*(\text{after storage}) - a^*(\text{before storage})$ $\Delta b^* = b^*(\text{after storage}) - b^*(\text{before storage})$ Incidentally, a* and b* are based on the CIE 1976 L*A*b* color system, and the a* and b* represent perceptual brightness indexes.

Here, the smaller the value of the $\Delta E^{*ab}$ becomes, the less contamination arises. In other words, it indicates that the degree of kick is less.

The respective results of the above evaluations are shown in Table 1.

TABLE 1

| | Volume average particle diameter (nm) | State of coating liquid | Adhesiveness | Abnormal transfer | Density characteristics (Density at the maximum energy) | Density characteristics (Density at 60% energy) | Light resistance color difference ($\Delta E^{*ab}$) | Contamination ($\Delta E^{*ab}$) |
|---|---|---|---|---|---|---|---|---|
| Example 1 | 258 | 2 | 1 | 1 | 2.32 | 0.5 | 8 | 0.8 |
| Example 2 | 265.7 | 2 | 1 | 1 | 2.31 | 0.51 | 8 | 0.9 |
| Example 3 | 249.3 | 2 | 1 | 1 | 2.33 | 0.51 | 8 | 0.8 |
| Example 4 | 267.6 | 2 | 1 | 1 | 2.31 | 0.51 | 8 | 0.9 |
| Example 5 | 193.1 | 2 | 1 | 1 | 2.34 | 0.53 | 8 | 0.8 |
| Example 6 | 195.2 | 2 | 2 | 2 | 2.57 | 0.55 | 8 | 1.2 |
| Example 7 | 182.5 | 2 | 1 | 1 | 2.35 | 0.52 | 8 | 0.8 |
| Example 8 | 158.9 | 2 | 1 | 1 | 2.34 | 0.54 | 8 | 1.3 |
| Example 9 | 161.4 | 2 | 1 | 1 | 2.33 | 0.54 | 8 | 1.5 |
| Example 10 | 189.5 | 2 | 1 | 2 | 2.70 | 1.05 | 10 | 4 |
| Comparative Example 1 | 494.4 | 4 | 3 | 3 | 2.27 | 0.39 | 9 | 1 |
| Comparative Example 2 | — | 1 | 1 | 1 | 2.18 | 0.99 | 8 | 10.9 |
| Comparative Example 3 | — | 1 | 3 | 2 | 2.48 | 1.13 | 14 | 12.2 |

As shown above, with respect to the coating liquids for colorant layer 1-10 which were used for preparing the thermal transfer sheets of Examples 1 to 10, the volume average particle diameters of all colorants were in the range of less than 270 nm and the colorants were uniformly dispersed, and there was substantially no precipitate, and thus they brought no problem in practical use as the coating liquid. In addition, there was also no problem in the adhesiveness. Furthermore, with respect to the printed articles that were formed using the thermal transfer sheets of Examples 1-10, no abnormal transfer was observed, and the density was also excellent as indicating 2.3 at the maximum density. Further, the light resistance was also good. Further, the colorant contamination to the back face layer was also in low level, thus the storage stability of the thermal transfer sheet was good. In particular, with respect to the coating liquids for colorant layer 7-10 which were used for preparing the thermal transfer sheets of Examples 1 to 7, the volume average particle diameters of colorants were miniaturized to 190 nm or less, and the density at the 60% energy and the density at the maximum energy were in relatively high level. In addition, with respect to the thermal transfer sheets of Examples 7-10 which have the colorant layer formed by using each individual coating liquids for colorant layer 7-10, the colorant contamination to the back face layer was also in low level, thus the storage stability of the thermal transfer sheet was good.

In particular, with respect to the coating liquids for colorant layer that were prepared in accordance with the above mentioned "third procedure for preparation of the coating liquid for colorant layer", that is, the coating liquids for colorant layer 8 and 9, which were prepared by post-addition of a liquid containing a binder resin, it was possible to miniaturize the particle diameter with a short period's dispersion (3 hours' dispersion for the coating liquids for colorant layer 8 and 9, whereas, 24 hours' dispersion for the coating liquids for colorant layer 1-7, and 10)

Further, with respect to the thermal transfer sheet of Example 10 which was prepared by using the coating liquid for colorant layer 10 which contained the colorant that was dispersible in the solvent, and the other colorant that was soluble in the solvent, it was possible to heighten the density at the 60% energy and the density at the maximum density, and also to obtain a good light resistance and a good storage stability.

In contrast, the printed article that was formed by using the thermal transfer sheet of Comparative Example 1 suffered with an inferior result in the highlight density and the abnormal transfer observed. The coating liquid for colorant layer A which was used for forming the thermal transfer sheet of Comparative Example 1 had a volume average particle diameter of the colorant of more than 300 nm, and tended to cause precipitation of the colorant, and thus, owned problems in the practical use. Also, the thermal transfer sheet of Comparative Example 1 possessed a low adhesiveness, and thus, owned problems in the practical use. The thermal transfer sheets of Comparative Examples 2 and 3 suffered with inferior results in the colorant contamination to the back face layer.

Example 11

As a substrate, polyethylene terephthalate film which underwent easy-adhesive treatment in advance, and has 4.5 µm in thickness was used. On one surface of this substrate, a coating liquid for back face layer 2 having the following composition was coated so as to obtain a coating amount of solid content of 0.5 g/m² and then the coated liquid was dried to form a back face layer. Then, on another surface of the substrate, the coating liquid for primer layer having the above mentioned composition was coated so as to obtain a coating amount of solid content of 0.1 g/m² and then the coated liquid was dried to form the primer layer. Next, on the primer layer, a coating liquid for colorant layer 11 which was prepared in accordance with the procedure mentioned below was coated so as to obtain a coating amount of solid content of 1.0 g/m², and then the coated liquid was dried to form an colorant layer. Ultimately, a thermal transfer sheet of Example 11 was prepared.

<Coating Liquid for Back Face Layer 2>

| | |
|---|---|
| Polyvinyl acetal resin (S-LEC BX-1, manufactured by Sekisui Chemical Co., Ltd.) | 60.8 parts |
| Polyisocyanate (BURNOCK D750, manufactured by DIC Corporation) | 4.2 parts |
| Zinc stearyl phosphate (LBT-1830 purified, manufactured by Sakai Chemical Industry Co., Ltd.) | 10 parts |
| Zinc stearate | 10 parts |

(SZ-PF, manufactured by Sakai Chemical Industry Co., Ltd.)

| | |
|---|---|
| Talc (MICRO ACE P-3, manufactured by Nippon Talc Co., Ltd.) | 5 part |
| Polyethylene wax (Polyethylene wax 3000, manufactured by Toyo ADL Corporation) | 10 parts |
| toluene | 200 parts |
| methyl ethyl ketone | 100 parts |

(Preparation of Coating Liquid for Colorant Layer 11)

A coating liquid for colorant layer 11 was prepared by adding a colorant, a dispersant, a binder resin, a polyethylene wax, and a solvent as the following composition of a coating liquid for colorant layer 11, as well as 250 parts by weight of zirconia beads having a particle diameter of 2.0 mm into a glass bottle, sealing the glass bottle, shaking the content with a paint shaker (manufactured by Asada Iron Works Co., Ltd.) for 1 hour as a preliminary crushing, then removing the above mentioned zirconia beads from the bottle and adding 250 parts by weight of zirconia beads having a particle diameter of 0.1 mm to the bottle, and dispersing the content with the paint shaker similarly for 24 hour as a main crushing.

<Coating Liquid for Colorant Layer 11>

| | |
|---|---|
| C.I. Disperse Yellow 201 | 2.3 parts |
| C.I. Disperse Yellow 54 | 2.3 parts |
| Pigment represented by the above Formula 3 (sulfonated derivative of C.I. Pigment Yellow 138) | 0.42 parts |
| Dispersant of acryl-based block type polymer (solid content 1.7 parts) (BYK-LPN21116, weight average molecular weight: 8000, solid content: 40%, manufactured by BYK Additives & Instruments) | 4.25 parts |
| Polyvinyl acetal resin (KS-5, manufactured by Sekisui Chemical Co., Ltd.) | 2.05 parts |
| Polyethylene wax (particle diameter: 5 μm) | 0.09 part |
| Toluene | 33 parts |
| Methyl ethyl ketone | 33 parts |

Example 12

A thermal transfer sheet of Example 12 which was provided with a colorant layer wherein a first colorant layer and a second colorant layer were layered was obtained by carrying out the same procedure as in Example 11 except that a coating liquid for colorant layer 12 having the following composition was coated on the substrate sheet so as to obtain a coating amount of solid content of 0.5 g/m² and then the coated liquid was dried to form the first colorant layer, and then a coating liquid for colorant layer 13 having the following composition was coated on the first colorant layer so as to obtain a coating amount of solid content of 0.5 g/m² and then the coated liquid was dried to form the second colorant layer, instead of using the coating liquid for colorant layer 11 of Example 11. Incidentally, the coating liquid for colorant layer 13 was prepared by a manufacturing procedure similar to that for the above mentioned coating liquid for colorant layer 11.

(Preparation of Coating Liquid for Colorant Layer 12)

A coating liquid for colorant layer 12 was prepared by adding a colorant, a dispersant, a binder resin, a polyethylene wax, and a solvent as the following composition of a coating liquid for colorant layer 12 into a glass bottle, sealing the glass bottle, heating the content at 50° C. for 1 hour, and then shaking the heated content with a paint shaker (manufactured by Asada Iron Works Co., Ltd.) for 30 minutes.

<Coating Liquid for Colorant Layer 12>

| | |
|---|---|
| C.I. Disperse Yellow 201 | 3.51 parts |
| Polyvinyl acetal resin (KS-5, manufactured by Sekisui Chemical Co., Ltd.) | 2.63 parts |
| Polyethylene wax (particle diameter: 5 μm) | 0.06 part |
| Toluene | 33 parts |
| Methyl ethyl ketone | 33 parts |

<Coating Liquid for Colorant Layer 13>

| | |
|---|---|
| C.I. Disperse Yellow 54 | 3.31 parts |
| Pigment represented by the above Formula 3 (sulfonated derivative of C.I. Pigment Yellow 138) | 0.20 parts |
| Dispersant of acryl-based block type polymer (solid content 1.19 parts) (BYK-LPN21116, weight average molecular weight: 8000, solid content: 40%, manufactured by BYK Additives & Instruments) | 2.975 parts |
| Polyvinyl acetal resin (KS-5, manufactured by Sekisui Chemical Co., Ltd.) | 1.44 parts |
| Toluene | 33 parts |
| Methyl ethyl ketone | 33 parts |

Example 13

A thermal transfer sheet of Example 13 was obtained by carrying out the same procedure as in Example 11 except that a coating liquid for colorant layer 14 wherein a sublimable dye represented by the following formula 5 (2.3 parts) was used instead of the C. I. Disperse Yellow 201 (2.3 parts) in the coating liquid for colorant layer 11 was used in place of the coating liquid for colorant layer 11.

[Chem. 8]

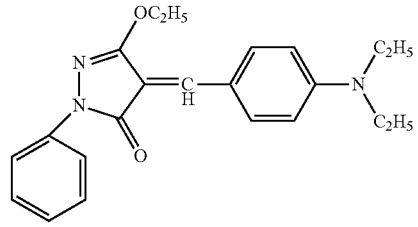

Formula 5

Comparative Example 4

A thermal transfer sheet of Comparative example 4 was obtained by carrying out the same procedure as in Example 11 except that the coating liquid for colorant layer 12 having the above mentioned composition was used in place of the coating liquid for colorant layer 11, and the coating liquid for colorant layer 12 was coated so as to obtain a coating amount of solid content of 1.0 g/m² and then the coated liquid was dried.

Comparative Example 5

A thermal transfer sheet of Comparative example 5 was obtained by carrying out the same procedure as in Example 11 except that a coating liquid for colorant layer D wherein a sublimable dye represented by the following formula 5 (3.51 parts) was used instead of the C. I. Disperse Yellow 201 (3.51 parts) in the coating liquid for colorant layer 12 was prepared and the coating liquid for colorant layer D was coated so as to obtain a coating amount of solid content of 1.0 g/m² and then the coated liquid was dried. Incidentally, the coating liquid for colorant layer D was prepared by a manufacturing procedure similar to that for the above mentioned coating liquid for colorant layer 12.

(Evaluation of Printing Density)

Using the same test printer that was used in the evaluation of the printing aptitude, and combining each individual thermal transfer sheet of Examples and Comparative Examples with the thermal transfer image-receiving sheet prepared in the above conditions, the gradation pattern was printed under the above mentioned printing condition 1 to examine the density property. The density property was measured at the highest density when applying a maximum energy, the evaluation of print density was done in accordance with the following criteria. The reflection density was measured by the spectrometer (SpectroLino, manufactured by Gretag Macbeth Co., Ltd.). The evaluation results are shown in Table 2.

"Evaluation Criteria"
◎: Concentration was not less than 2.1.
○: Concentration was not less than 2.0 and less than 2.1.
Δ: Concentration was less than 2.0.

(Evaluation of Contamination)

The contamination to the back layer was evaluated in order to determine the storage stability of the thermal transfer sheet. The evaluation of contamination was carried out in the same method as the above mentioned evaluation of the contamination to the back surface layer of Examples 1-10 and Comparative Examples 1-3, and the evaluation of contamination was done in accordance with the following criteria. The evaluation results are shown in Table 2.

"Evaluation Criteria"
○: $\Delta E^{*ab}$ was less than 10.
Δ: $\Delta E^{*ab}$ was not less than 10.

(Scumming Evaluation)

The scumming of the printed article was evaluated in order to determine the storage stability of the thermal transfer sheet. In order to evaluate the scumming, a group wherein each individual thermal transfer sheet of Examples and Comparative examples had been stored for 60 hours under a condition of 50° C. and 80% RH, and another group wherein each individual thermal transfer sheet of Examples and Comparative examples had not been stored in such a condition as above mentioned were prepared. Then, using predetermined image-receiving paper, the printing was executed. The white background portion of each individual printed article obtained, to which no energy had been applied, underwent measurement by using the spectrometer (SpectroLino, manufactured by Gretag Macbeth Co., Ltd.), and the color difference ($\Delta E^{*ab}$) was determined by the following equation. Then, the scumming was evaluated in accordance with the following criteria. The evaluation results are also shown in Table 2.

Color difference $\Delta E^{*ab} = ((\Delta a^*)^2 + (\Delta b^*)^2)^{1/2}$

Please see, CIE 1976 La*b* color system (JIS Z8729 (1980))

$\Delta a^* = a^*$(after storage)$- a^*$(before storage)

$\Delta b^* = b^*$(after storage)$- b^*$(before storage)

Incidentally, a* and b* are based on the CIE 1976 L*A*b* color system, and the a* and b* represent perceptual brightness indexes.

Here, the smaller the value of the $\Delta E^{*ab}$ becomes, the less reduction under high temperature and high humidity condition and the higher storing stability arise.

"Evaluation Criteria"
◎: $\Delta E^{*ab}$ was less than 0.2.
○: $\Delta E^{*ab}$ was not less than 0.2 and less than 0.3.
Δ: $\Delta E^{*ab}$ was not less than 0.3.

TABLE 2

|  | Printing density | Contamination evaluation | Scumming evaluation |
| --- | --- | --- | --- |
| Example 11 | ○ | ○ | ○ |
| Example 12 | ○ | ○ | ◎ |
| Example 13 | ◎ | ○ | ○ |
| Comparative example 4 | ○ | Δ | Δ |
| Comparative example 5 | ◎ | Δ | Δ |

As is apparent from Table 2, with respect to the printed articles obtained by using the thermal transfer sheets of Examples 11 to 13, the concentration was good as indicating a value of not less than 2.0 at the highest concentration. In addition, the colorant contamination to the back face layer surface was in low level and the scumming was also in low level, and thus the storage stability of the thermal transfer sheet was good. In contrast, with respect to the printed articles obtained by using the thermal transfer sheets of Comparative Examples 4 and 5, although the concentration was good enough, the colorant contamination to the back face layer and the scumming increased, and thus the storage stability of the thermal transfer sheet became worse.

EXPLANATION OF NUMERALS

1 . . . thermal transfer sheet
2 . . . substrate sheet
3 . . . colorant layer
4 . . . primer layer
5 . . . back face layer
10y . . . sublimable dye capable of being dissolved in the predetermined solvent
10x . . . colorant capable of being dispersed in the predetermined solvent
1X . . . thermal transfer sheet for comparison

The invention claimed is:

1. A thermal transfer sheet comprising:
a substrate sheet; and
a colorant layer provided on one surface of the substrate sheet,
wherein the colorant layer contains a residual solvent, a first sublimable dye soluble in the solvent, a second sublimable dye dispersible in the solvent, and a binder resin,
wherein an average dispersed particle diameter of the second sublimable dye dispersible in the solvent is not less than 50 nm and not more than 300 nm,
wherein the first sublimable dye has an affinity for the second sublimable dye to repress localization of the first sublimable dye at interfaces of the colorant layer, and
wherein the second sublimable dye is a quinophthalone-based colorant represented by the following Formula 1, Formula 1

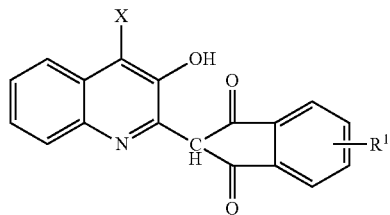

wherein, X represents a hydrogen atom or a halogen atom, and R¹ represents a hydrogen atom, an alkyl group or derivative thereof having 1 to 5 carbon atoms, an acyl group including an alkyl group or a benzoic ring having a total carbon number of 6 to 10.

2. A method of manufacturing a thermal transfer sheet, comprising:
a colorant layer forming step of applying a coating liquid for a colorant layer onto a surface of a substrate sheet,
wherein the coating liquid for the colorant layer contains a solvent, a first sublimable dye soluble in the solvent, a second sublimable dye dispersible in the solvent, and a binder resin,
wherein an average dispersed particle diameter of the second sublimable dye dispersed in the solvent is not less than 50 nm and not more than 300 nm,
wherein the first sublimable dye has an affinity for the second sublimable dye to repress localization of the first sublimable dye at interfaces of the colorant layer, and
wherein the second sublimable dye is a quinophthalone-based colorant represented by the following Formula 1, Formula 1

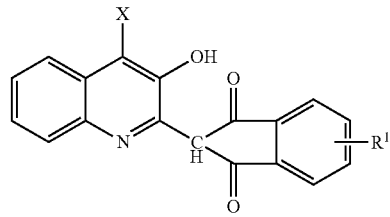

wherein, X represents a hydrogen atom or a halogen atom, and R¹ represents a hydrogen atom, an alkyl group or derivative thereof having 1 to 5 carbon atoms, an acyl group including an alkyl group or a benzoic ring having a total carbon number of 6 to 10.

3. The method of manufacturing a thermal transfer according to claim 2, wherein the coating liquid for colorant layer further contains a dispersant.

* * * * *